US012651947B2

(12) United States Patent (10) Patent No.: US 12,651,947 B2
Kataoka et al. (45) Date of Patent: Jun. 9, 2026

(54) ROTARY ELECTRIC MACHINE AND PUMP

(71) Applicant: NIDEC POWERTRAIN SYSTEMS CORPORATION, Kanagawa (JP)

(72) Inventors: Shigehiro Kataoka, Kanagawa (JP); Tomohiro Sakata, Kanagawa (JP); Heng Cao, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 352 days.

(21) Appl. No.: 18/544,464

(22) Filed: Dec. 19, 2023

(65) Prior Publication Data

US 2024/0213859 A1 Jun. 27, 2024

(30) Foreign Application Priority Data

Dec. 23, 2022 (JP) ................................ 2022-206629

(51) Int. Cl.
　H02K 11/33 (2016.01)
　F04B 17/03 (2006.01)
　H02K 3/52 (2006.01)
　H02K 11/40 (2016.01)

(52) U.S. Cl.
　CPC .............. H02K 11/40 (2016.01); F04B 17/03 (2013.01); H02K 3/522 (2013.01); H02K 2203/06 (2013.01)

(58) Field of Classification Search
　CPC ......... F04B 17/03; H02K 11/33; H02K 11/40; H02K 2203/06; H02K 3/522; H02K 5/22; H02K 5/225
　See application file for complete search history.

(56) References Cited

U.S. PATENT DOCUMENTS

| | | | | |
|---|---|---|---|---|
| 10,604,173 B2 * | 3/2020 | Okamura | ............. | H05K 1/0227 |
| 2022/0320942 A1 * | 10/2022 | Kataoka | .................. | F04D 13/06 |

FOREIGN PATENT DOCUMENTS

JP 　　　　2019080471 　　　5/2019

* cited by examiner

*Primary Examiner* — Naishadh N Desai

(74) *Attorney, Agent, or Firm* — JCIPRNET

(57) ABSTRACT

An aspect of a rotary electric machine of the disclosure includes: a rotor, able to rotate about a central axis as a center; a stator, opposite to the rotor, with a gap being interposed between the rotor and the stator; a substrate, electrically connected with the stator; a first housing, formed of metal, being open on a side in an axial direction, and accommodating the stator; a second housing, fixed, on the side in the axial direction, to the first housing, accommodating the substrate, and having an insulating property; and a conductor, electrically connected with the substrate and the first housing. The substrate has a grounding pattern. The conductor has: a first connector, electrically connected with the first housing inside the first housing; and a second connector, electrically connected with the grounding pattern.

20 Claims, 15 Drawing Sheets

ROTARY ELECTRIC MACHINE AND PUMP

CROSS REFERENCE TO RELATED APPLICATIONS

The present invention claims priority under 35 U.S.C. § 119 to Japanese Application No. 2022-206629 filed on Dec. 23, 2022 the entire content of which is incorporated herein by reference.

TECHNICAL FIELD

The disclosure relates to a rotary electric machine and a pump.

BACKGROUND

A rotary electric machine having a structure in which a grounding pattern of a substrate is grounded by being electrically connected with a portion accommodating the substrate in a metal housing is known. For example, in a conventional structure, a grounding pattern of a substrate and a housing are electrically connected by a screw in a driving device including an electric motor.

In a rotary electric machine, a portion accommodating a substrate in a housing may be formed of an insulating material, such as resin. In such case, in order to ground a grounding pattern of the substrate, it is considered to make a metal component connected with the grounding pattern protrude toward the outside of the housing to ground the metal component. However, in such case, the size of the rotary electric machine may be increased.

SUMMARY

An aspect of a rotary electric machine of the disclosure includes: a rotor, able to rotate about a central axis as a center; a stator, opposite to the rotor, with a gap being interposed between the rotor and the stator; a substrate, electrically connected with the stator; a first housing, formed of metal, being open on a side in an axial direction, and accommodating the stator; a second housing, fixed, on the side in the axial direction, to the first housing, accommodating the substrate, and having an insulating property; and a conductor, electrically connected with the substrate and the first housing. The substrate has a grounding pattern. The conductor has: a first connector, electrically connected with the first housing inside the first housing; and a second connector, electrically connected with the grounding pattern.

An aspect of a pump of the disclosure includes the rotary electric machine and a pump mechanism connected with the rotary electric machine.

The above and other elements, features, steps, characteristics and advantages of the present disclosure will become more apparent from the following detailed description of the preferred embodiments with reference to the attached drawings.

DETAILED DESCRIPTION

In each figure, a central axis J of a pump of each of the following embodiments is shown as appropriate. The central axis J is a hypothetical axis. In the following description, a direction in which the central axis J extends, that is, the axial direction of the central axis J, is simply referred to as "axial direction", a radial direction with the central axis J as the center is simply referred to as "radial direction", and a circumferential direction with the central axis J as the center is simply referred to as "circumferential direction". In each figure, Z-axis parallel to the axial direction is shown. In the following description, in the axial direction, a side (+Z side) toward which an arrow sign of Z-axis is directed is referred to as "upper side", and a side (−Z side) opposite to the side toward which the arrow sign of Z-axis is directed is referred to as "lower side". In each of the following embodiments, the upper side is equivalent to "a side in the axial direction", and the lower side is equivalent to "an other side in the axial direction". The terms "upper side" and "lower side" are simply expressions used to explain the arrangement relationships of the respective parts, and the actual arrangement relationships may also be those other than the arrangement relationship indicated by such expressions.

Figure 1:
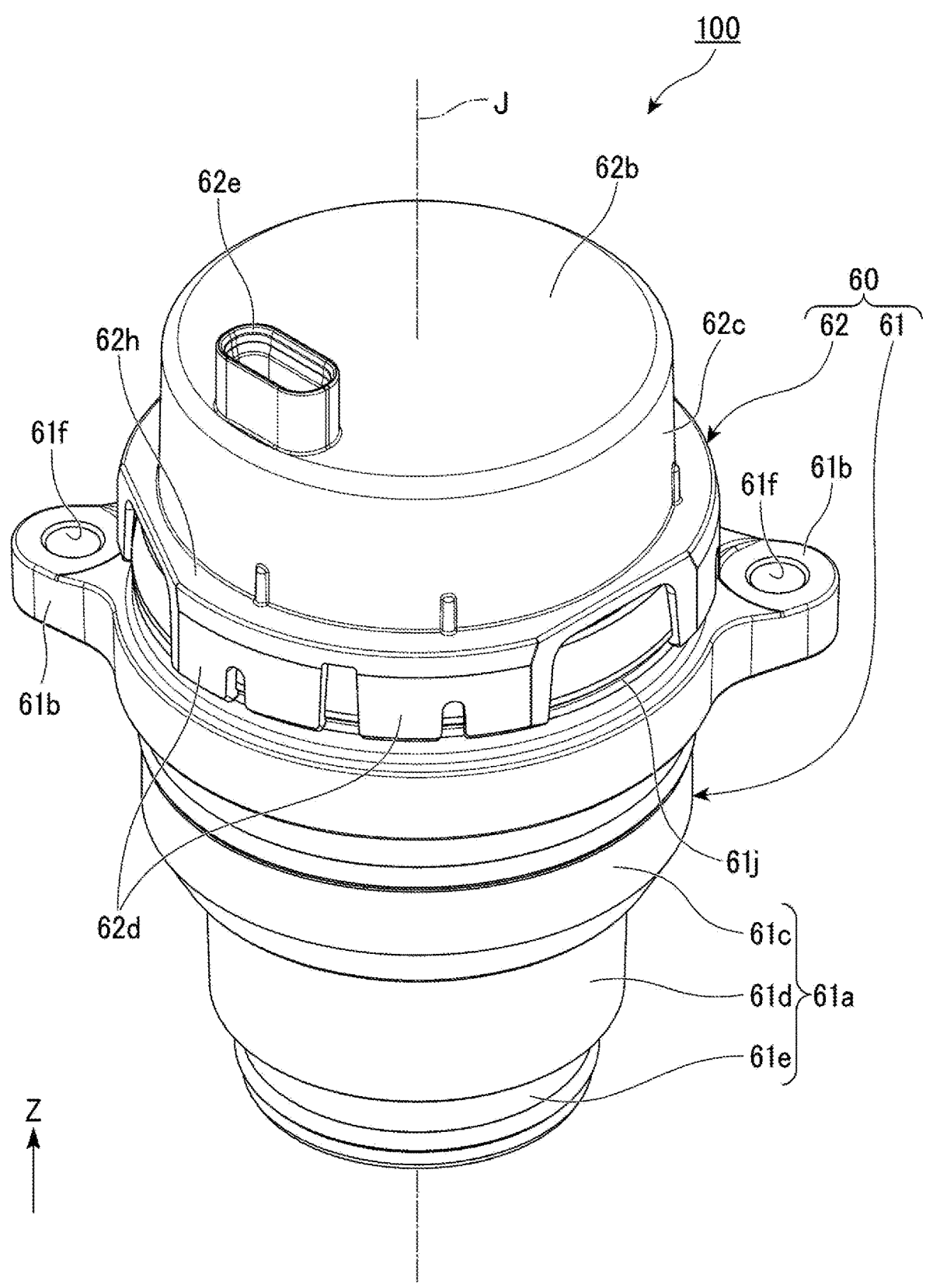
FIG. 1 is a perspective view illustrating a pump according to a first embodiment.
Figure 2:
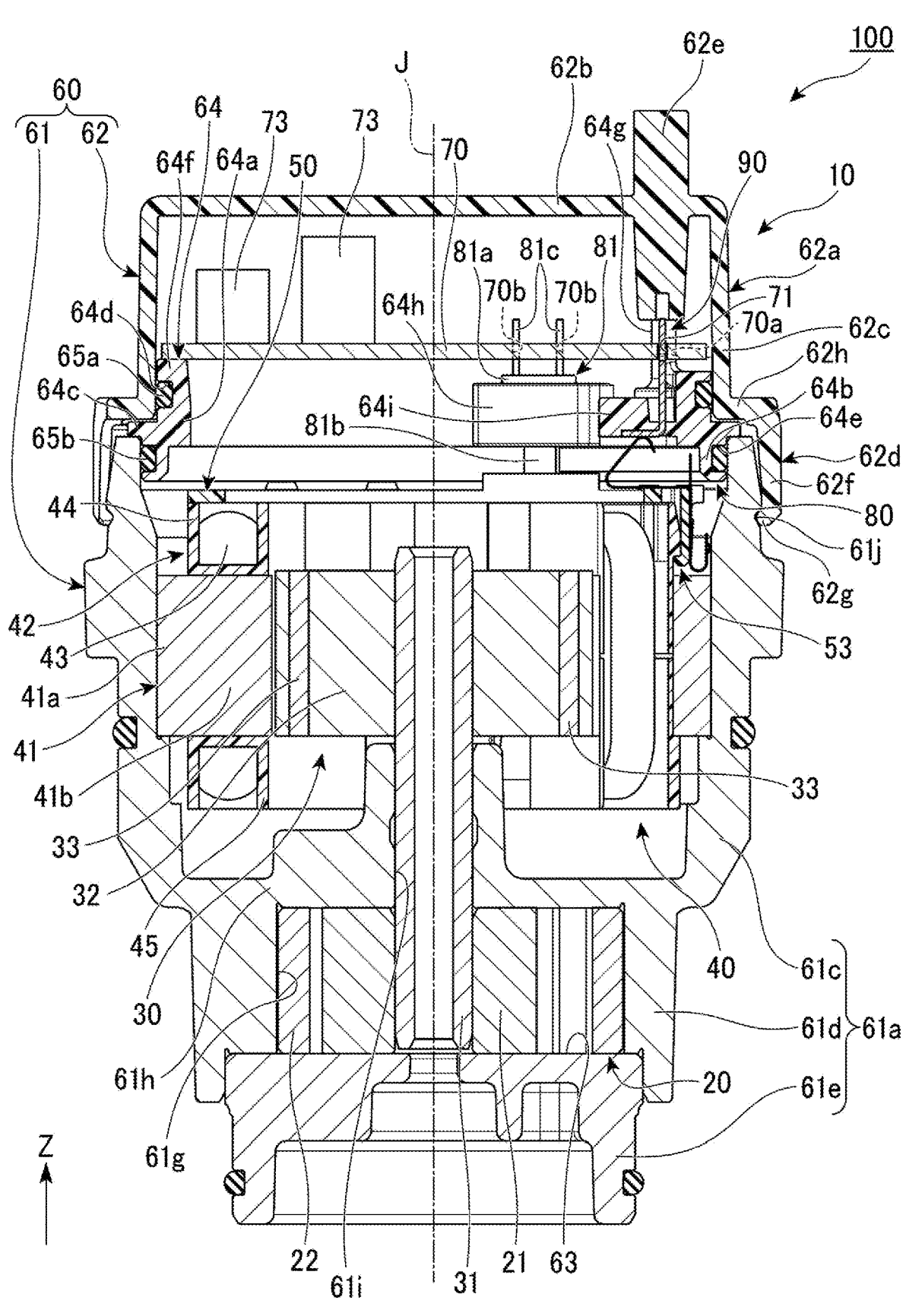
FIG. 2 is a cross-sectional view illustrating the pump according to the first embodiment.

A pump 100 of the embodiment as shown in FIG. 1 is, for example, an electric pump mounted in a vehicle. The fluid transported by the pump 100 is, for example, oil. However, the fluid transported by the pump 100 is not particularly limited, and may also be a fluid other than oil, such as water. As shown in FIG. 2, the pump 100 includes a rotary electric machine 10 and a pump mechanism 20 connected with the rotary electric machine 10.

The pump mechanism 20 is driven by the rotary electric machine 10 to transport the fluid. The pump mechanism 20 is accommodated in a pump chamber 63 provided in a first housing 61 to be described afterwards. The pump mechanism 20 is provided with an inner rotor 21 and an outer rotor 22. The inner rotor 21 is rotated about the central axis J by the rotary electric machine 10 and the outer rotor 22 surrounds the inner rotor 21 and is engaged with the outer rotor 22.

The rotary electric machine 10 includes a rotor 30, a stator 40, a third insulator 50, a housing 60, and a substrate 70. The rotor 30 is rotatable about the central axis J as the center. The stator 40 is opposite to the rotor 30, with a gap interposed between the rotor 30 and the stator 40. The rotor 30 includes a shaft 31, a rotor core 32, and multiple magnets 33. The shaft 31 extends in the axial direction, the rotor core 32 is fixed to the outer circumferential surface of the shaft 31, and the magnets 33 are fixed to the rotor core 32. The shaft 31 in the embodiment is a cylindrical or substantially cylindrical, hollow shaft extending with the central axis J as the center and being open on both sides in the axial direction. The lower end of the shaft 31 is connected with an inner rotor 21.

The stator 40 is located on the radially outer side of the rotor 30. The stator 40 is in a ring shape or a substantially ring shape surrounding the rotor 30. The stator 40 has a stator core 41, an insulator 42, and multiple coils 43. The insulator 42 is installed to the stator core 41, and the coils 41 are installed to the stator core 41 via the insulator 42.

Figure 3:
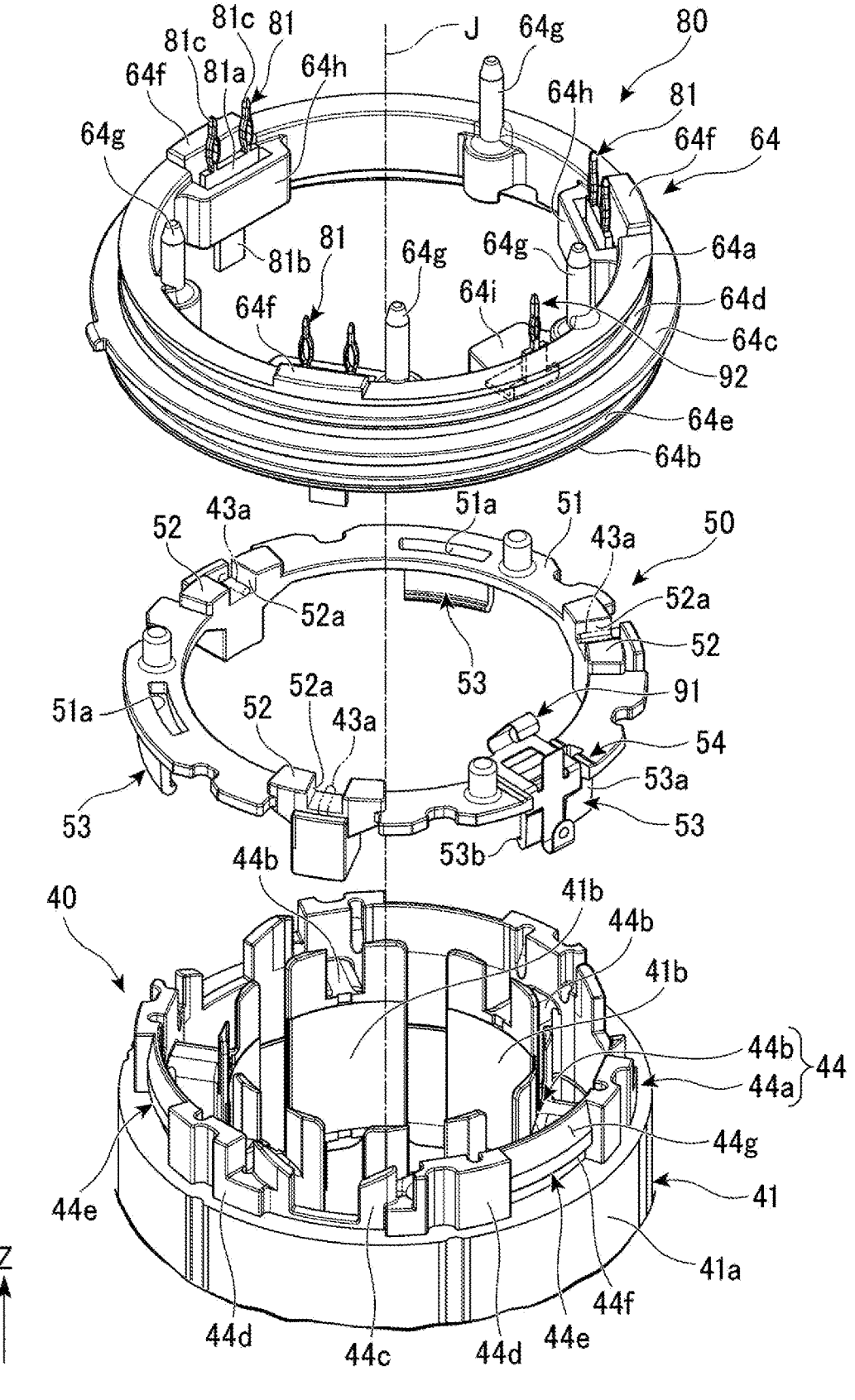
FIG. 3 is an exploded perspective view illustrating a portion of a stator, a third insulator, and a terminal member assembly in the first embodiment.

The stator core 41 is provided on the radially outer side of the rotor core 32 to be opposite to the rotor core 32, with a gap interposed between the stator core 41 and the rotor core 32. As shown in FIG. 3, the stator core 41 includes a core back 41a and multiple teeth 41b. The core back 41a has a ring shape or a substantially ring shape surrounding the central axis, and the teeth 41b extend from the core back 41a toward the radially inner side. The teeth 41b are provided equidistantly in the circumferential direction throughout the entire circumference. The coils 43 are installed to the teeth 41b via the insulator 42.

As shown in FIG. 2, the insulator 42 has a first insulator 44 having an insulating property and a second insulator 45 having an insulating property. The first insulator 44 is an insulator located on the upper side of the stator core 41. The second insulator 45 is an insulator located on the lower side of the stator core 41. In the embodiment, the first insulator 44 and the second insulator 45 are formed of resin. As shown in FIG. 3, the first insulator 44 is in a ring shape or a substantially ring shape surrounding the central axis J. The first insulator 44 has a ring-shaped part 44a and multiple extensions 44b. The ring-shaped part 44a is located on the upper side of the core back 41a, and the extensions 44b extend from the ring-shaped part 44a toward the radially inner side. The extensions 44b respectively cover the teeth 41b from the upper side and both sides in the circumferential direction.

The ring-shaped part 44a is in an annular shape or a substantially annular shape with the central axis J as the center. The outer diameter of the ring-shaped part 44a is smaller than the outer diameter of the stator core 41. The radially outer surface of the ring-shaped part 44a is located further away toward the radially inner side with respect to the radially outer surface of the stator core 41. The ring-shaped part 44 has a ring-shaped body 44c, multiple projections 44d projecting from the body 44c toward the radially outer side, and multiple claws 44e protruding from the body 44c toward the radially outer side. The projections 44d are respectively provided at portions connected with the extensions 44b in the ring-shaped part 44a. The projections 44d are provided equidistantly in the circumferential direction throughout the entire circumference.

Multiple claws 44e are provided at intervals in the circumferential direction. The claws 44e are provided equidistantly in the circumferential direction throughout the entire circumference. Three claws 44e are provided, for example. Each claw 44e is provided between the projections 44d adjacent in the circumferential direction. The claw 44e extends in the circumferential direction. The claw 44e connects the pair of projections 44d adjacent in the circumferential direction. The radially outer end of the claw 44e is located on the radially inner side with respect to the radially outer end of the projection 44d. The upper end of the claw 44e is provided at the upper end in the outer circumferential surface of the body 44c. The lower end of the claw 44e is located separately from the upper side of the radially inner edge of the core back 41a.

The lower surface of the claw 44e is a first contact surface 44f opposite to the upper surface of the core back 41a at an interval. The first contact surface 44f is oriented toward the lower side and is a flat surface orthogonal to the axial direction. The radially outer surface of the claw 44e has an inclined surface 44g. The inclined surface 44g is located on the radially inner side toward the upper side. The upper end of the inclined surface 44g is the upper end on the radially outer surface of the claw 44e.

The third insulator 50 has an insulating property. In the embodiment, the third insulator 50 is formed of resin. The third insulator 50 is an insulator located on the upper side of the stator core 41. In the embodiment, the third insulator 50 is located on the upper side of the first insulator 44. The third insulator 50 is installed to the first insulator 44. The third insulator 50 is in a ring shape or a substantially ring shape surrounding the central axis J. More specifically, the third insulator 50 is in an annular shape or a substantially annular shape with the central axis J as the center.

Figure 4:
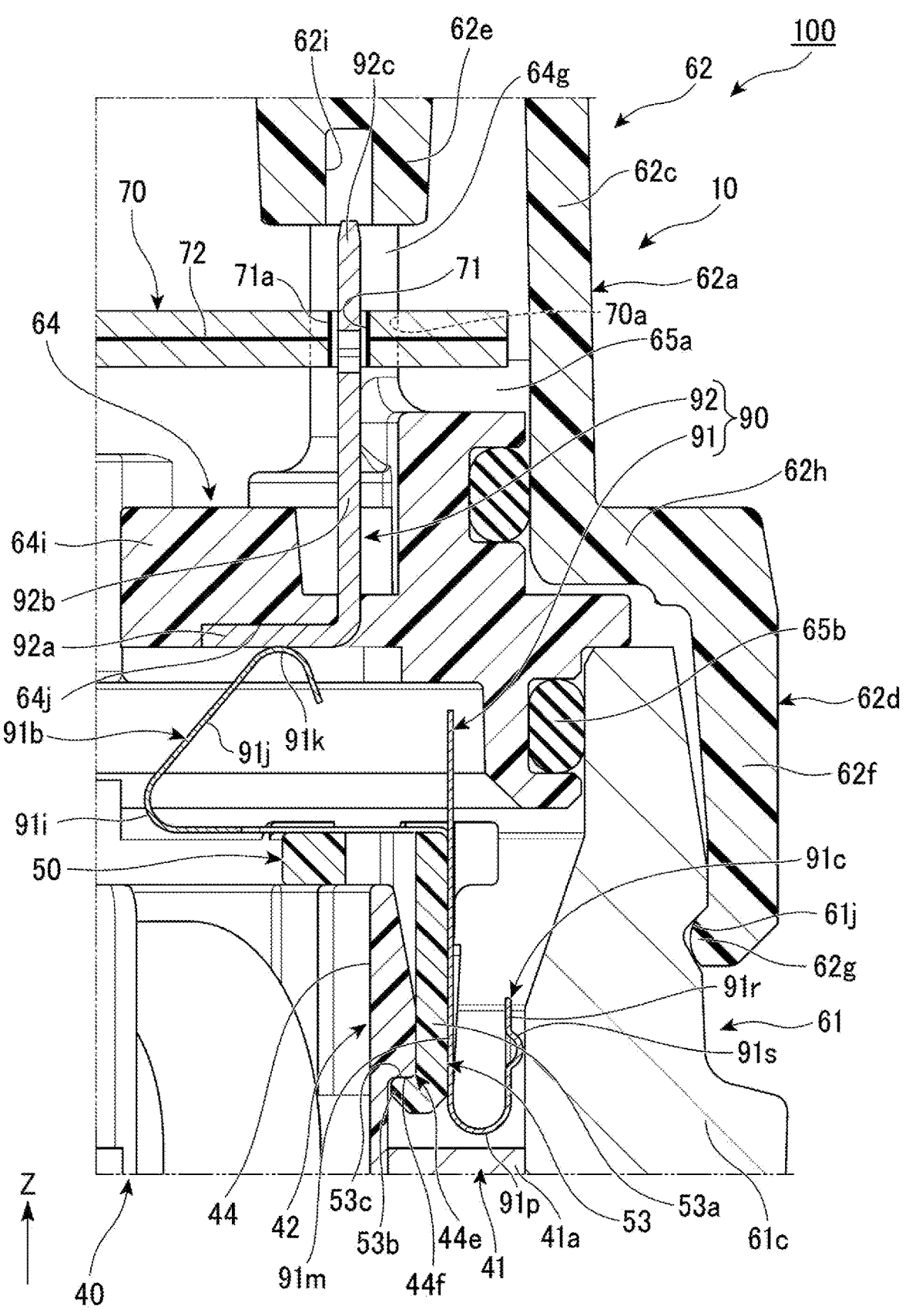
FIG. 4 is a cross-sectional view illustrating a portion of the pump according to the first embodiment, and is a partially enlarged view of FIG. 2.

As shown in FIG. 4, the third insulator 50 is located inside the first housing 61. The upper end of the third insulator 50 is located on the lower side with respect to the upper end of the first housing 61. The radially outer surface of the third insulator 50 is located further away toward the radially inner side from the radially inner surface of the first housing 61. That is, a gap is provided between the third insulator 50 and the first housing 61 in the radial direction. As shown in FIG. 3, the third insulator 50 has a ring-shaped part 51, a lead wire holder 52, and a claw 53.

The ring-shaped part 51 is in an annular shape or a substantially annular shape with the central axis J as the center. The ring-shaped part 51 is in a plate shape or a substantially plate shape in which the plate surface is oriented toward the axial direction. The ring-shaped part 51 has a hole 51a penetrating through the ring-shaped part 51 in the axial direction. The hole 51a extends in the circumferential direction. Multiple holes 51a are provided at intervals in the circumferential direction. In the embodiment, three holes 51a are provided. When viewed in the axial direction, the holes 51a are respectively provided at positions overlapped with claw bodies 53b (to be described afterwards) of the claws 53.

The lead wire holder 52 is a portion holding a coil lead wire 43a drawn out from the coil 43. Multiple lead wire holders 52 are provided at intervals in the circumferential direction. The lead wire holder 52 has a concave 52a into which a terminal member 81 to be described afterwards is inserted. By inserting the terminal member 81 into the concave 52a from the upper side, the terminal member 81 and the coil lead wire 43a are electrically connected.

The claw 53 extends from the ring-shaped part 51 to the lower side. Multiple claws 53 are provided at intervals in the circumferential direction. In the embodiment, three claws 53 are provided. The claw 53 has a base 53*a* extending from the ring-shaped part 51 to the lower side and the claw body 53*b* protruding from the lower recess of the base 53*a* to the radially inner side. The base 53*a* is in a plate shape or a substantially plate shape in which the plate surface is oriented toward the radial direction. The base 53*a* is elastically deformable in the radial direction, with the upper end connected with the ring-shaped part 51 as a fulcrum.

As shown in FIG. 4, the claw body 53*b* has a second contact surface 53*c* contacting the first contact surface 44*f* from the lower side. The second contact surface 53*c* is oriented toward the upper side and is a flat surface orthogonal to the axial direction. By bringing the second contact surface 53*c* into contact with the first contact surface 44*f* from the lower side, the claw 53 is hooked to the claw 44*e* from the lower side. By hooking each claw 53 to each claw 44*e* from the lower side, the third insulator 50 is fixed to the first insulator 44 of the insulator 42. The third insulator 50 in the embodiment is fixed to the insulator 42 by using a snap-fit structure defined by the claws 53 and the claws 44*e*.

Figure 5:
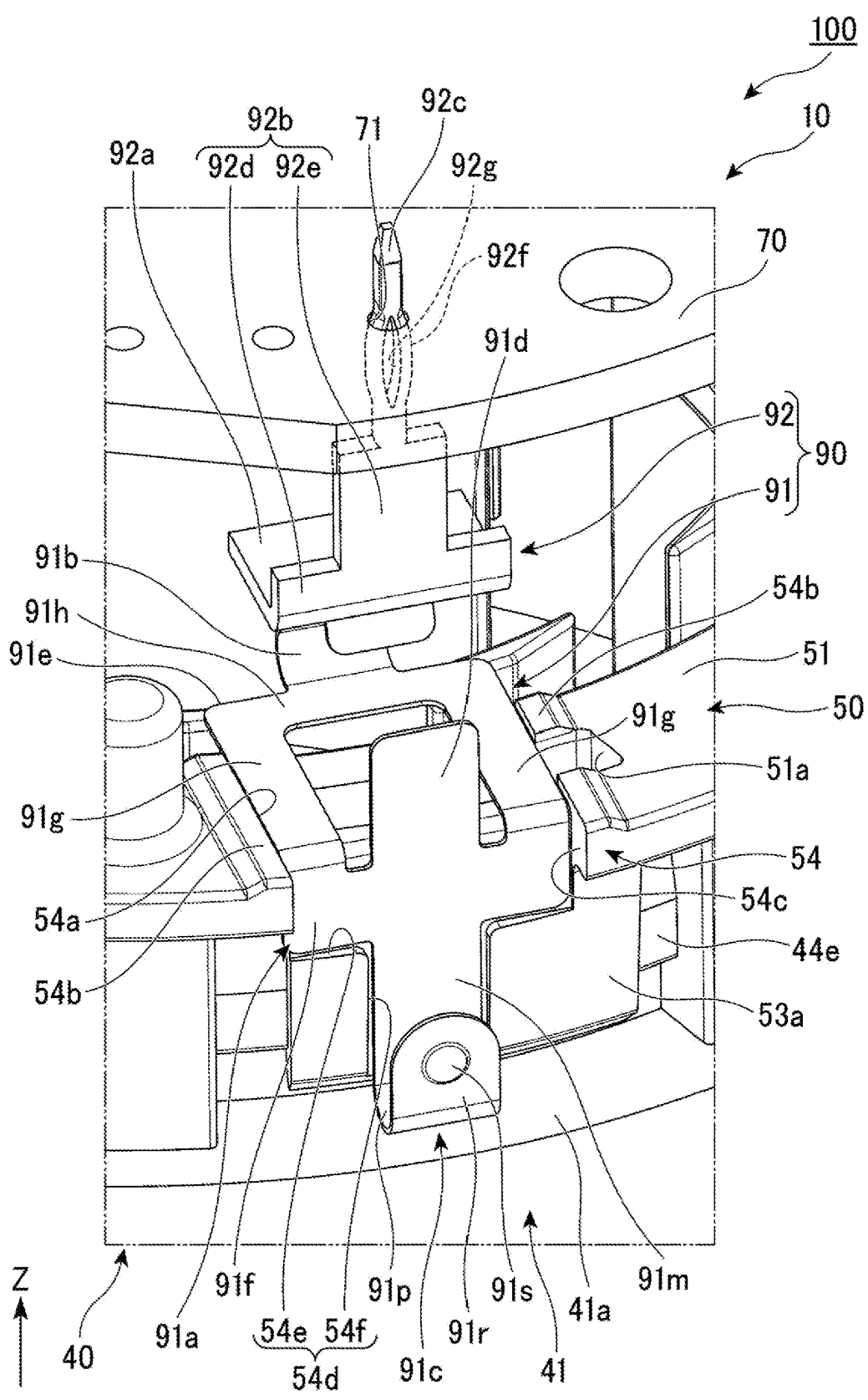
FIG. 5 is a perspective view illustrating a portion of the pump according to the first embodiment.
Figure 6:
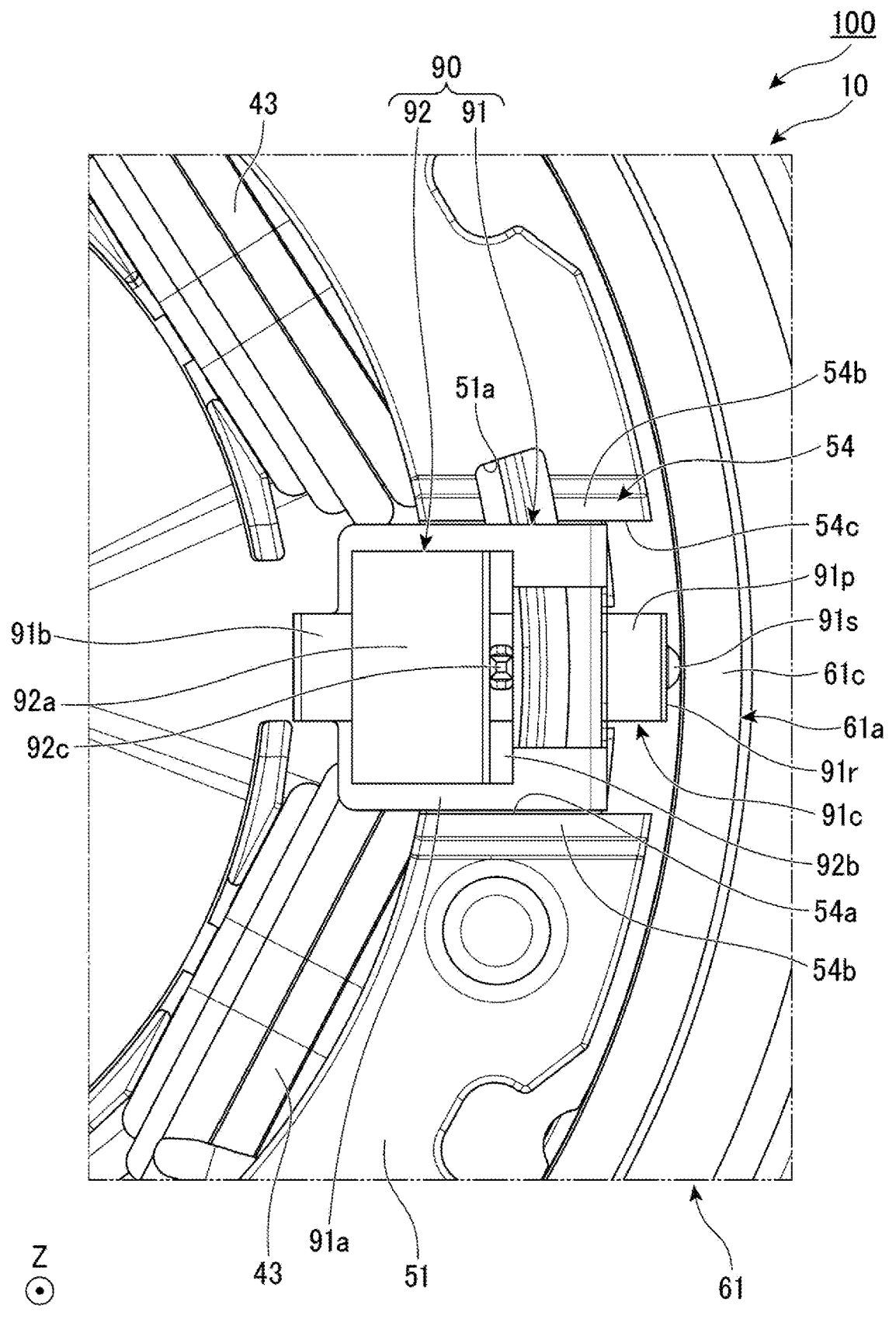
FIG. 6 is a view illustrating a portion of the pump according to the first embodiment, when viewed from the upper side.
Figure 7:
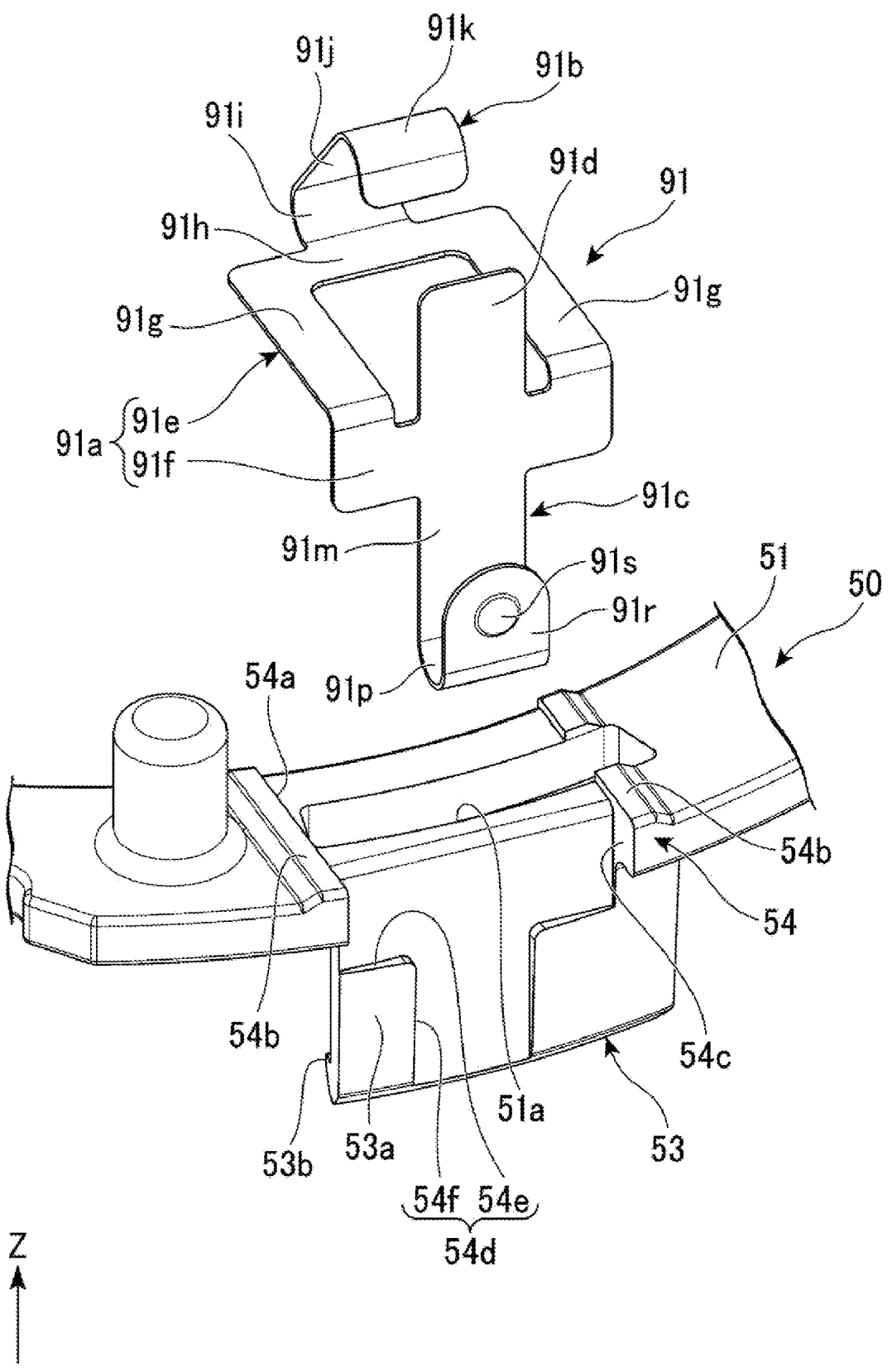
FIG. 7 is an exploded perspective view illustrating a portion of the third insulator and a first member of a conductor in the first embodiment.

As shown in FIGS. 5 to 7, the third insulator 50 has a conductor support 54 supporting a first member 91 of a conductor 90 to be described afterwards. In the embodiment, the conductor support 54 is defined by a portion where one claw 53 is provided in the ring-shaped part 51 and such claw 53. The conductor support 54 has a groove 54*a* provided on the upper surface of the ring-shaped part 51. That is, the groove 54*a* is provided on the upper surface of the third insulator 50. The groove 54*a* extends in the radial direction and is open on the radially outer side. In the embodiment, the groove 54*a* is also open on the radially inner side. In the groove 54*a*, one hole 51*a* is provided. A projection 54*b* projecting toward the upper side is provided at each of the two edges of the groove 54*a* in the circumferential direction. The projection 54*b* expands in the radial direction. The projection 54*b* extends along the radial direction. One of the pair of projections 54 is divided up in the radial direction by the hole 51*a*.

As shown in FIG. 7, the conductor support 54 has a through part 54*c* penetrating through the radially outer end of the groove 54*a* in the axial direction. The through part 54*c* penetrates through the radially outer edge of the ring-shaped part 51. The through part 54*c* is open on the radially outer side. By providing the through part 54*c*, the radially outer edge in the portion where the groove 54*a* is provided in the ring-shaped part 51 is recessed toward the radially inner side with respect to the radially outer edge in portions located on both sides of the groove 54*a* in the circumferential direction in the ring-shaped part 51.

The conductor support 54 has a support concave 54*d* provided on the radially outer surface of the claw 53. The support concave 54*d* is recessed from the radially outer surface in the base 53*a* of the claw 53 toward the radially inner surface. The support concave 54*d* is open on both sides in the axial direction. The surface facing the radially outer side in the inner surface of the support concave 54*d* is smoothly connected with the radially outer surface in the portion where the through part 54*c* is provided in the ring-shaped part 51.

The support concave 54*d* has a wide part 54*e* and a narrow part 54*f*. The wide part 54*e* is an upper portion of the support concave 54*d*. The narrow part 54*f* is a lower portion of the support concave 54*d*. The dimension of the wide part 54*e* in the circumferential direction is greater than the dimension of the narrow part 54*f* in the circumferential direction. The wide part 54*e* protrudes toward both sides in the circumferential direction with respect to the narrow part 54*f*. The wide part 54*e* is open on the upper side and a side in the circumferential direction. The narrow part 54*f* is connected with the lower side of the wide part 54*e*. The narrow part 54*f* is open on the lower side.

As shown in FIG. 2, the housing 60 accommodates the pump mechanism 20, the rotor 30, the stator 40, the third insulator 50, and the substrate 70. The housing 60 has a first housing 61 and a second housing 62. That is, the rotary electric machine 10 includes the first housing 61 and the second housing 62.

The first housing 61 accommodates the pump mechanism 20, the rotor 30, the stator 40, and the third insulator 50. The first housing 61 is formed of metal. The first housing 61 has a tubular shape or a substantially tubular shape open on the upper side. As shown in FIG. 1, the first housing 61 is in a cylindrical shape or a substantially cylindrical shape with the central axis J as the center. The first housing 61 has a first housing body 61*a* and an installer 61*b*.

The first housing body 61*a* is in a cylindrical shape or a substantially cylindrical shape with the central axis J as the center. As shown in FIG. 2, the first housing body 61*a* accommodates the rotor 30, the stator 40, and the third insulator 50. The first housing body 61*a* has a stator accommodator 61*c*, a pump mechanism accommodator 61*d*, and a pump cover 61*e*. The stator accommodator 61*c* and the pump mechanism accommodator 61*d* are portions of the same component. The pump cover 61*e* is a component separate from the stator accommodator 61*c* and the pump mechanism accommodator 61*d*.

The stator accommodator 61*c* is in a cylindrical shape or a substantially cylindrical shape open on the upper side and having the central axis J as the center. The stator accommodator 61*c* accommodates the stator 40. The outer circumferential surface of the stator core 41 is fixed to the inner circumferential surface of the stator accommodator 61*c*. The stator accommodator 61*c* has a bottom wall 61*h* located on the lower side. A hole 61*i* through which the shaft 31 passes in the axial direction is provided in the bottom wall 61*h*.

The pump mechanism accommodator 61*d* is connected with the lower side of the stator accommodator 61*c*. The outer diameter of the pump mechanism accommodator 61*d* is smaller than the outer diameter of the stator accommodator 61*c*. The pump mechanism accommodator 61*d* has an accommodation concave 61*g* recessed from the lower surface of the pump mechanism accommodator 61*d* toward the upper side. By blocking at least a portion in the opening on the lower side of the accommodation recess 61*g* by using the pump cover 61*e*, the pump chamber 63 accommodating the pump mechanism 20 is defined. A lower end of the shaft 31 passing through the hole 61*i* is inserted into the pump chamber 63. The lower end of the shaft 31 is connected with the inner rotor 21 in the pump chamber 63.

As shown in FIG. 1, the installer 61*b* protrudes toward the radially outer side from the first housing body 61*a*. More specifically, the installer 61*b* protrudes toward the radially outer side from the outer circumferential surface in the upper portion of the stator accommodator 61*c*. The installer 61*b* and the stator accommodator 61*c* are portions of the same component. Multiple installers 61*b* are provided at intervals in the circumferential direction. In the embodiment, a pair of installers 61*b* sandwiching the central axis J are provided. The installer 61*b* has an installation hole 61*f* penetrating through the installer 61*b* in the axial direction.

The installer 61*b* is a portion installed to an apparatus to which the pump 100 is installed. The installer 61*b* of the embodiment is fixed to the housing of the apparatus by tightening a bolt passing through the installation hole 61f to the housing of the apparatus to which the pump 100 is installed. The housing of the apparatus is formed of metal, for example, and is electrically connected with the first housing 61 formed of metal.

The second housing 62 is fixed to the upper side of the first housing 61. The second housing 62 blocks the opening on the upper side of the first housing 61. The second housing 62 has an insulating property. In the embodiment, the second housing 62 is formed of resin. The second housing 62 is in a tubular shape or a substantially tubular shape surrounding the central axis J. More specifically, the second housing 62 is in a cylindrical shape or a substantially cylindrically shape open on the lower side and having the central axis J as the center. As shown in FIG. 2, the second housing 62 accommodates the substrate 70. The second housing 62 has a cover 62a and a support 64. In the embodiment, the cover 62a and the support 64 are separate components.

The cover 62a covers the substrate 70 from the upper side. The cover 62a is in a cylindrical shape or a substantially cylindrical shape open on the lower side. As shown in FIG. 1, the cover 62a includes a ceiling wall 62b, a peripheral wall 62c, a flange 62h, a fixing claw 62d, and a connector 62e. The ceiling part 62b is in a disc shape or a substantially disc shape expanding in the radial direction. As shown in FIG. 2, the ceiling wall 62b covers the substrate 70 from the upper side. The peripheral wall 62c protrudes from the radially outer edge of the ceiling wall 62b toward the lower side. The peripheral wall 62c is in a cylindrical shape or a substantially cylindrical shape with the central axis J as the center. The substrate 70 is provided on the radially inner side of the peripheral wall 62c. The flange 62h protrudes from the lower end of the peripheral wall 62c toward the radially outer side. The flange 62h is in a substantially annular shape surrounding the central axis J. The flange 62h is in a plate shape or a substantially plate shape in which the plate surface is oriented toward the axial direction.

The fixing claw 62d protrudes from the radially outer edge of the flange 62h toward the lower side. The fixing claw 62d is located on the radially outer side of the upper end of the first housing 61. The fixing claw 62d has a base 62f and a claw body 62g. The base 62f protrudes from the radially outer edge of the flange 62h toward the lower side, and the claw body 62g protrudes from the lower end of the base 62f toward the radially inner side. The claw body 62g is inserted into the fixing groove 61j provided on the outer circumferential surface of the first housing 61, and is hooked to a portion located on the upper side in the inner surface of the fixing groove 61j from the lower side. Accordingly, the fixing claw 62d is fixed to the first housing 61. As shown in FIG. 1, multiple fixing claws 62d are provided at intervals in the circumferential direction. By using the fixing claws 62d, the second housing 62 is fixed to the first housing 61.

The connector 62e is provided on the ceiling wall 62b. As shown in FIG. 2, the connector 62e protrudes from the ceiling wall 62b toward both sides in the axial direction. While not shown in the drawings, multiple terminals are held in the connector 62e. The terminals are electrically connected with the substrate 70. A connector of an external apparatus is connected with the connector 62e.

In the embodiment, the support 64 is equivalent to a "bottom" located between the substrate 70 and the stator 40 in the axial direction. The support 64 is fit with the radially inner side of the lower end in the peripheral wall 62c of the cover 62a. As shown in FIG. 3, the support 64 is in a ring shape or a substantially ring shape surrounding the central axis J. More specifically, the support 64 is in an annular shape or a substantially annular shape with the central axis J as the center. In the embodiment, the support 64 is a component holding the terminal member 81. The support 64, for example, is provided through insert-molding adopting the terminal member 81 and the conductor 90 to be described afterwards as insertion components. A terminal member assembly 80 is defined by the support 64, the terminal member 81, and the conductor 90.

The support 64 has a first ring-shaped part 64a, a second ring-shaped part 64b, a flange 64c, a substrate support 64f, a protrusion 64g, a terminal holder 64h, and a conductor holder 64i. The first ring-shaped part 64a is in an annular shape or a substantially annular shape with the central axis J as the center. As shown in FIG. 2, the first ring-shaped part 64a is fit with the radially inner side in the lower end of the peripheral wall 62c. A seal groove 64d with which a seal member 65a is fit is provided on the outer circumferential surface of the first ring-shaped part 64a. The seal groove 64d is in an annular shape or an annular shape surrounding the central axis J. In the embodiment, the seal member 65a is an O-ring. The seal member 65a seals between the outer circumferential surface of the first ring-shaped part 64a and the inner circumferential surface of the peripheral wall 62c.

The second ring-shaped part 64b is in an annular shape or a substantially annular shape with the central axis J as the center. The second ring-shaped part 64b is connected with the lower side of the first ring-shaped part 64a. The outer diameter of the second ring-shaped part 64b is greater than the outer diameter of the first ring-shaped part 64a. The inner diameter of the second ring-shaped part 64b is greater than the inner diameter of the first ring-shaped part 64a. The second ring-shaped part 64b is fit into the opening on the upper side of the first housing 61. A seal groove 64e with which a seal member 65b is fit is provided on the outer circumferential surface of the second ring-shaped part 64b. The seal groove 64e is in an annular shape or a substantially annular shape surrounding the central axis J. In the embodiment, the seal member 65b is an O-ring. The seal member 65b seals between the outer circumferential surface of the second ring-shaped part 64b and the inner circumferential surface at the upper end of the first housing 61.

The flange 64c protrudes from the lower end of the first ring-shaped part 64a toward the radially outer side. The flange 64c is in an annular shape or a substantially annular shape with the central axis J as the center. The flange 64c is in a plate shape or a substantially plate shape in which the plate surface is oriented toward the axial direction. The flange 64c is located between the flange 62h of the cover 62a and the upper end of the first housing 61 in the axial direction. The flange 64c is sandwiched in the axial direction in a state of contacting the flange 62h and the upper end of the first housing 61.

As shown in FIG. 3, the substrate support 64f protrudes from the upper surface of the first ring-shaped part 64a toward the upper side. In the embodiment, when viewed in the axial direction, the substrate support 64f is in an oblong shape or a substantially oblong shape elongated in the circumferential direction. Multiple substrate supports 64 are provided at intervals in the circumferential direction. In the embodiment, three substrate supports 64 are provided. The substrate supports 64f are provided equidistantly in the circumferential direction throughout the entire circumference. As shown in FIG. 2, the upper surface of the substrate support 64f contacts the lower surface at the radially outer edge of the substrate 70. Accordingly, the support 64 supports the substrate 70 from the lower side.

As shown in FIG. 3, the protrusion 64g protrudes from the radially inner edge of the first ring-shaped part 64a toward the upper side. The protrusion 64g protrudes toward the upper side with respect to the substrate support 64f. The protrusion 64g is in a cylindrical columnar shape or a substantially cylindrical columnar shape. Multiple protrusions 64g are provided at intervals in the circumferential direction. In the embodiment, four protrusions 64g are provided. As shown in FIG. 4, the protrusion 64g passes through a hole 70a provided in the substrate 70 in the axial direction. With the protrusions 64g passing through the respective holes 70a, the substrate 70 is radially positioned with respect to the support 64.

As shown in FIG. 3, the terminal holder 64h protrudes from the inner circumferential surface of the first ring-shaped part 64a toward the radially inner side. The terminal holder 64h holds the terminal member 81. Accordingly, the support 64 supports the terminal member 81. Multiple terminal holders 64 are provided at intervals in the circumferential direction. In the embodiment, three terminal holders 64h are provided. The terminal holders 64h are provided equidistantly in the circumferential direction throughout the entire circumference. The positions of the terminal holders 64h in the circumferential direction are respectively the same as the positions of the substrate supports 64f in the circumferential direction. Each terminal holder 64h is located on the radially inner side of each substrate support 64f.

The conductor holder 64i protrudes from the inner circumferential surface of the first ring-shaped part 64a toward the radially inner side. The conductor holder 64i is located between the adjacent terminal holders 64h in the circumferential direction. The conductor holder 64i holds a second member 92 to be described afterwards. The radially inner end of the conductor holder 64i is located on the radially inner side with respect to the radially inner end of the terminal holder 64h.

In each terminal member 81 held in each terminal holder 64h, a portion of the terminal member 81 is embedded in the terminal holder 64h. The terminal member 81 protrudes from the terminal member 81 toward both sides in the radial direction. The terminal member 81 is formed of metal. The terminal member 81 has a base 81a, a coil connector 81b, and a substrate connector 81c. The base 81a is in a plate shape or a substantially plate shape in which the plate surface is oriented toward the radial direction. The base 81a is held by the terminal holder 64h.

The coil connector 81b is connected with the lower end of the base 81a, and protrudes toward the lower side with respect to the terminal holder 64h. The coil connector 81b is in a plate shape or a substantially plate shape in which the plate surface is oriented toward the radial direction. The coil connector 81b is inserted into the concave 52a of the third insulator 50 from the upper side and electrically connected with the coil lead wire 43a held in the concave 52a. Accordingly, the terminal member 81 is electrically connected with the coil lead wire 43a.

The substrate connector 81c protrudes from the upper edge of the substrate 81a toward the upper side. In the embodiment, a pair of substrate connectors 81c are provided at intervals in the circumferential direction. As shown in FIG. 2, the substrate connector 81c passes through the hole 70a provided in the substrate 70 in the axial direction. In the embodiment, the substrate connector 81c is a press-fit terminal electrically connected with the substrate 70 by being pressed into the hole 70b. The coil connector 81b is electrically connected with the coil lead wire 43a, and the substrate connector 81c is electrically connected with the substrate 70. Accordingly, the substrate 70 is electrically connected with the stator 40 via the terminal member 81.

In the embodiment, the substrate 70 is in a plate shape or a substantially plate shape in which the plate surface is oriented toward the axial direction. The substrate 70 expands in the radial direction. The radially outer edge of the substrate 70 contacts the upper surface of the substrate support 64f of the support 64. The substrate 70 is a printed wiring substrate in which a wiring pattern (not shown) is provided. In the embodiment, the substrate 70 is a multi-layer substrate. Multiple electronic components 73 are installed to the substrate 70. While not shown in the drawings, an inverter circuit supplying power to the stator 40 is provided on the substrate 70. Such inverter circuit supplies a current to the coil 43 via the terminal member 81 connected with the substrate 70 and the coil lead wire 43a. Accordingly, the rotor 30 rotates to drive the pump mechanism 20.

As shown in FIG. 4, the substrate 70 has a grounding pattern 72. The grounding pattern 72 is a solid pattern formed of copper foil, for example. In the embodiment, the grounding pattern 72 defines one of multiple layers defining the substrate 70 that is a multi-layer substrate. The grounding pattern 72, for example, is a layer located between a layer located on the uppermost side and a layer located on the lowermost side, among the layers defining the substrate 70 in the axial direction. The grounding pattern 72 may be provided with respect to the substrate 70 in any manner. The substrate 70 has a grounding hole 71 penetrating through the substrate 70 in the axial direction. A plated part 71a is provided on the inner surface of the grounding hole 71. The plated part 71a is, for example, copper-plated. The plated part 71a is electrically connected with the grounding pattern 72.

The rotary electric machine 10 includes the conductor 90 electrically connecting the substrate 70 and the first housing 61. The conductor 90 has a conductive property. The conductor 90 is formed of metal. In the embodiment, the conductive member 90 has a first member 91 and a second member 92. The first member 91 and the second member 92 are components separate from each other. In the embodiment, the first member 91 and the second member 92 are sheet metals. The first member 91 and the second member 92 are in contact with each other in the axial direction.

Figure 8:
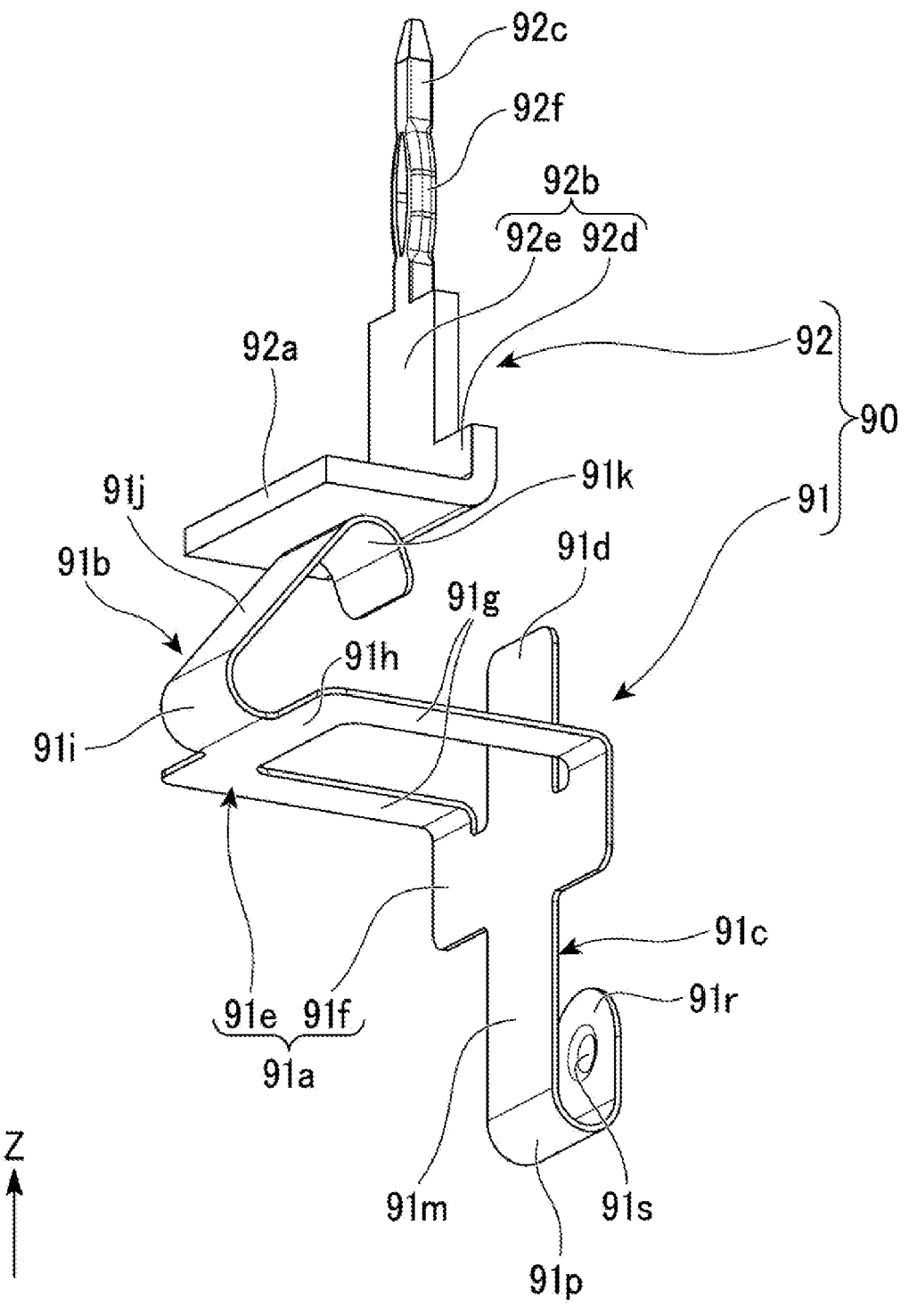
FIG. 8 is a perspective view illustrating a conductor according to the first embodiment.

As shown in FIG. 5, in the embodiment, the first member 91 is supported by the third insulator 50. More specifically, the first member 91 is supported by the conductive member support 94. As shown in FIGS. 7 and 8, the first member 91 has a supported part 91a, an elastic part 91b, a first connector 91c, and a protrusion 91b. That is, the conductor 90 has the supported part 91a, the elastic part 91b, the first connector 91c, and the protrusion 91d.

The supported part 91a is a portion supported by the third insulator 50. The supported part 91a has an axial contactor 91e and a radial contactor 91f. The axial contactor 91e is in a plate shape or a substantially plate shape in which the plate surface is oriented toward the axial direction. The axial contactor 91e has a pair of arms 91g and a link 91h. The pair of arms 91g extend in the radial direction and provided in the circumferential direction with a gap interposed therebetween. The link 91h extends in a direction orthogonal to the radial direction in which the pair of arms 91g extend, and connects the radially inner ends of the pair of arms 91g.

As shown in FIG. 5, the axial contactor 91e is fit into the groove 54a from the upper side. That is, a portion of the supported part 91a is fit into the groove 54a. Accordingly, the supported part 91*a* is hooked on the inner side surface of the groove 54*a* in the circumferential direction, and the circumferential deviation of the first member 91 with respect to the third insulator 50 is suppressed. It may also be that the entire supported part 91*a* is fit into the groove 54*a*. In the embodiment, the pair of arms 91*g* are fit with the groove 54*a*. Via the opening of the groove 54*a* on the radially inner side, the radially inner ends of the pair of arms 91*g* protrude toward the radially inner side with respect to the radially inner edge of the ring-shaped part 51. The pair of arms 91*g* are in contact with the bottom surface on the lower side of the groove 54*a*. Accordingly, the axial contactor 91*e* contacts the third insulator 50 in the axial direction, and the supported part 91*a* contacts the third insulator 50 in the axial direction. The axial contactor 91*e* is supported by the bottom surface on the lower side of the groove 54*a* from the lower side. That is, the first member 91 is supported by the third insulator 50 from the lower side. Accordingly, the first member 91 is positioned in the axial direction by the third insulator 50. The link 91*h* is located on the radially inner side with respect to the radially inner edge of the ring-shaped part 51.

The radial contactor 91*f* extends in the circumferential direction, and connects the radially outer ends of the pair of arms 91. The radial contactor 91*f* is in a plate shape or a substantially plate shape in which the plate surface is oriented toward the radial direction. The radial contactor 91*f* protrudes from the radially outer ends of the pair of arms 91*g* toward the lower side. The radial contactor 91*f* is inserted into the wide part 54*e* of the support concave 54*d*. The radial contactor 91*f* contacts a surface facing the radially outer side in the inner surface of the wide part 54*e*. Accordingly, the radial contactor 91*f* contacts the third insulator 50 in the radial direction, and the supported part 91*a* contacts the third insulator 50 in the radial direction. That is, the first member 91 contacts the radially outer surface of the third insulator 50. Accordingly, the first member 91 is positioned in the radial direction by the third insulator 50.

The elastic part 91*b* is a portion elastically deformable in the axial direction. The elastic part 91*b* protrudes from the radially inner end of the supported part 91*a* toward the upper side. In the embodiment, the elastic part 91*b* protrudes toward the upper side from the circumferential central part in the radially inner edge of the link 91*h*. As shown in FIG. 8, the elastic part 91*b* includes a curved part 91*i*, a third extension 91*j*, and an elastic contactor 91*k*. That is, the conductor 90 has the curved part 91*i*, the third extension 91*j*, and the elastic contactor 91*k*.

The curved part 91*i* is a portion connected with the supported part 91*a*. When viewed in the circumferential direction, the curved part 91*i* is in a plate shape or a substantially plate shape extending by being curved in an arc shape or a substantially arc shape convex toward the radially inner side. That is, the curved part 91*i* is curved in an orientation of being convex toward a direction intersecting with the axial direction. Accordingly, the elastic part 91*b* can be easily deformed elastically in the axial direction. It may also be that, when viewed in the circumferential direction, the curved part 91*i* is in a plate shape or a substantially plate shape extending by being curved in an arc shape or a substantially arc shape convex toward the radially outer side after extending in the axial direction.

The third extension 91*j* is in a substantially oblong shape or an oblong shape obliquely extending from the upper end of the curved part 91*i* toward the upper side and the radially outer side. The elastic contactor 91*k* is connected with the upper and radially outer ends of the curved part 91*i*. When viewed in the circumferential direction, the elastic contactor 91*k* is in a plate shape or a substantially plate shape extending by being curved in an arc shape or a substantially arc shape convex toward the upper side. The elastic contactor 91*k* contacts the second member 92. In the elastic part 91*b*, when the first member 91 and the second member 92 are brought into contact, by pressing the elastic contactor 91*k* toward the lower side by using the second member 92, the curved part 91*i* is elastically deformed, and the third extension 91*j* and the elastic contactor 91*k* are elastically displaced toward the lower side, with the curved part 91*i* as a fulcrum. In the embodiment, in the state of contacting the second member 92, the elastic part 91*b* enters a state of being elastically deformed toward the axially lower side, and an upward force is applied to the second member 92. In this way, by bringing the first member 91 and the second member 92 into contact with each other via the elastic part 91*b*, the positional deviation of the first member 91 and the second member 92 in the axial direction can be absorbed through the elastic deformation of the elastic part 91*b*, and the first member 91 and the second member 92 can be brought into proper contact in a state in which the first member 91 and the second member 92 are pressed against each other by using the elastic force of the elastic part 91*b*.

The first connector 91*c* protrudes from the radially outer end of the supported part 91*a* toward the lower side. More specifically, the first connector 91*c* protrudes from the circumferential central part in the lower edge of the radial contactor 91*f* toward the lower side. As shown in FIG. 4, the first connector 91*c* is located between the radially outer surface of the third insulator 50 and the radially inner surface of the first housing 61 in the radial direction. In the embodiment, the first connector 91*c* is located between the radially outer surface of the claw 53 and the inner circumferential surface of the stator accommodator 61*c* in the radial direction. The first connector 91*c* has a first extension 91*m*, an axial curved part 91*p*, a second extension 91*r*, and a contact projection 91*s*.

As shown in FIG. 5, the first extension 91*m* extends from the radial contactor 91*f* toward the lower side. The first extension 91*m* has an oblong plate shape or a substantially oblong plate shape which is elongated in the axial direction, and in which the plate surface is oriented toward the radial direction. The first extension 91*m* is inserted into the narrow part 54*f* of the support concave 54*d*. Accordingly, the first extension 91*m* is hooked, in the circumferential direction, to the inner side surfaces of both sides of the narrow part 54*f* in the circumferential direction, and the position of the first connector 91*c* in the circumferential direction can be suppressed from being deviated. The first extension part 91*m* contacts a surface facing the radially outer side in the inner surface of the narrow part 54*f*. Accordingly, the first connector 91*c* contacts the third insulation member 50 in the radial direction.

When viewed in the circumferential direction, the axial curved part 91*p* is in a plate shape or a substantially plate shape extending by being curved in an arc shape or a substantially arc shape convex toward the lower side. The axial curved part 91*p* is provided to be opposite to the upper side of the core back 41*a*, with a gap interposed therebetween. By providing the axial curved part 91*p*, the first connector 91*c* is elastically deformable in the radial direction.

The second extension 91*r* extends from the radially outer end of the axial curved part 91*p* toward the upper side. The second extension 91*r* is in a plate shape or a substantially plate shape in which the plate surface is oriented toward the radial direction. The second extension part 91*r* is located on the radially outer side of the first extension 91*m*. The second extension part 91*r* is opposite to the first extension 91*m* in the radial direction, with a gap interposed therebetween. When viewed in the radial direction, the upper edge of the second extension 91*r* is in an arc shape or a substantially arc shape convex toward the upper side. The upper end of the second extension 91*r* is located on the lower side with respect to the upper end of the first extension 91*m*.

The contact projection 91*s* protrudes from the second extension 91*r* toward the radially outer side. In the embodiment, the contact projection 91*s* is in a hemispherical shell shape or a substantially hemispherical shell shape convex toward the radially outer side. The contact projection 91*s* is provided, for example, by caulking a portion of the second extension 91*r* toward the radially outer side. As shown in FIGS. 4 and 6, the contact projection 91*s* contacts the inner circumferential surface of the stator accommodator 61*c*. That is, the first connector 91*c* contacts the radially inner surface of the first housing 61. Accordingly, the first connector 91*c* is electrically connected with the first housing 61 inside the first housing 61.

In a state in which, with the axial curved part 91*p* serving as a fulcrum, the second extension 91*c* and the contact projection 91*s* are elastically displaced in an orientation of being elastically displaced toward the radially inner side, the first connector 91*c* contacts the first housing 61. Accordingly, the contact projection 91*s* can be pressed against the first housing 61 from the radially inner side, and the first connector 91*c* can be properly electrically connected with the first housing 61. In this way, according to the embodiment, the first connector 91*c* is elastically deformable in the radial direction, is located between the radially outer surface of the third insulator 50 and the radially inner surface of the first housing 61 in the radial direction, and contacts the radially inner surface of the first housing 61. As a result, the first connector 91*c* can be properly electrically connected with the housing 61.

As shown in FIG. 5, the protrusion 91*d* protrudes from the radially outer end of the supported part 91*a* toward the upper side. Therefore, at the time of assembling the first member 91, the protrusion 91*d* can be pinched by a jig, etc. Accordingly, the first connector 91*c* of the first member 91 can be easily inserted into the gap between the third insulator 50 and the first housing 61 in the radial direction from the upper side. Therefore, the first member 91 can be easily assembled.

In the embodiment, the protrusion 91*d* protrudes from the circumferential central part in the upper edge of the radial contactor 91*f* toward the upper side. The protrusion 91*d* is in an oblong shape or a substantially oblong plate shape which is elongated in the axial direction and in which the plate surface is oriented toward the radial direction. The upper end of the protrusion 91*d* is located on the lower side with respect to the upper end of the elastic part 91*b*. The protrusion 91*d* is located on the radially outer side with respect to the elastic part 91*b*. The protrusion 91*d* is located on the upper side of the first connector 91*c*, and, when viewed in the axial direction, provided at a position overlapped with the first connector 91*c*. Therefore, at the time of pinching the protrusion part 91*d* to assemble the first member 91, the first connector 91*c* located on the lower side of the protrusion 91*d* can be properly inserted into the gap between the third insulator 50 and the first housing in the radial direction from the upper side. When viewed in the axial direction, the protrusion 91*d* in the embodiment is provided at a position overlapped with the first extension 91*m* of the first connector 91*c*.

The second member 92 is located on the upper side of the first member 91, and contacts the first member 91 in the axial direction. As shown in FIG. 4, in the embodiment, the second member 92 penetrates through the support 64 in the axial direction. Accordingly, the conductor 90 penetrates through the support 64 serving as the bottom in the axial direction. A portion of the second member 92 is embedded in the conductor holder 64*i*. Accordingly, the second member 92 is held by the support 64. The second member 92 has a first wall 92*a*, a second wall 92*b*, and a second connector 92*c*. That is, the conductor 90 has the first wall 92*a*, the second wall 92*b*, and the second connector 92*c*.

The first wall 92*a* is in a rectangular plate shape or a substantially rectangular shape in which the plate surface is oriented toward the axial direction. The first wall 92*a* is embedded in the lower surface of the conductor holder 64*i*. The lower surface of the first wall 92*a* is provided at the same position as the lower surface of the conductor holder 64*i* in the axial direction, and is exposed to the outside of the conductor holder 64*i*. The elastic contactor 91*k* of the first member 91 contacts the lower surface of the first wall 92*a*. The upper surface of the first wall 92*a* contacts the lower surface 64*j* of the conductor holder 64*i*. The lower surface 64*j* of the conductor holder 64*i* supports the first wall 92*a* receiving the reaction force of the elastic force due to the elastic part 91*b* of the first member 91 being elastically deformed toward the lower side in the axial direction.

The second wall 92*b* protrudes from the radially outer end of the first wall 92*a* to the upper side. The second wall 92*b* is in a plate shape or a substantially plate shape in which the plate surface is oriented toward the radial direction. As shown in FIG. 5, the second wall 92*b* has a wide part 92*d* and a narrow part 92*e*. The wide part 92*d* is connected with the radially outer end of the second wall 92*b*, and the narrow part 92*e* is connected with the upper side of the wide part 92*d*. The dimension of the wide part 92*d* in the circumferential direction is the same as the dimension of the first wall 92*a* in the circumferential direction, and is greater than the dimension of the narrow part 92*e* in the circumferential direction. The narrow part 92*e* extends from the circumferential central part of the wide part 92*d* toward the upper side.

The second connector 92*c* protrudes from the upper end of the second wall 92*b* toward the upper side. In the embodiment, the second connector 92*c* extends from the circumferential central part in the upper end of the narrow part 92*e* toward the upper side. In the embodiment, the second connector 92*c* is in a long and thin, rectangular columnar or substantially rectangular columnar shape extending in the axial direction. The second connector 92*c* passes through the grounding hole 71 provided in the substrate 70 in the axial direction. The second connector 92*c* contacts the plated part 71*a* provided on the inner surface of the grounding hole 71. Accordingly, the second connector 92*c* is electrically connected with the grounding pattern 72 via the plated part 71*a*. Therefore, by using the conductor 90, the grounding pattern 72 of the substrate 70 can be electrically connected with the first housing 61. Therefore, the second housing 62 accommodating the substrate 70 can be provided as a component having an insulating property, such as resin, while the grounding pattern 72 can be grounded via the conductor 90 and the first housing 61. Accordingly, the reference voltage of the grounding pattern 72 can be stabilized, and noise due to currents flowing through the substrate 70 can be suppressed from being generated.

In addition, according to the embodiment, the first connector 91*c* is electrically connected with the first housing 61 inside the first housing 61. Therefore, it is not required to arrange the component for grounding the grounding pattern 72 of the substrate 70 to protrude to the outside of the second housing 62, and the size of the rotary electric machine 10 can be suppressed from increasing. Therefore, according to the embodiment, the size of the rotary electric machine 10 can be suppressed from increasing, and the grounding pattern 72 of the substrate 70 can be grounded. Moreover, compared with the case where the component for grounding the grounding pattern 72 is arranged to protrude to the outside of the second housing 62 to be connected with the first housing 61 from the outside, the rotary electric machine 10 can be assembled easily. Moreover, differing from the case where the substrate 70 is directly fixed to a metallic housing through screw fastening, it is not required to provide a component having an insulating property between the substrate 70 and the second housing 62. Moreover, an issue such as that the fixing of the substrate 70 becomes loosened due to the deformation through the deterioration of the component having an insulating property over time can also be suppressed.

In addition, according to the embodiment, the first housing 61 has the installer 61*b* protruding from the first housing body 61*a* toward the radially outer side. Therefore, by fixing the installer 61*b* to the housing of the apparatus to which the rotary electric machine 10 is installed, the grounding pattern 72 can be electrically connected with the housing of the apparatus via the conductor 90, the first housing body 61*a*, and the installer 64*b*. In this way, the grounding pattern 72 can be grounded properly.

In addition, according to the embodiment, the conductor 90 penetrates through the support 64 serving as the bottom in the axial direction. Therefore, the stator 40 can be easily electrically connected with the substrate 70 by providing the support 64 serving as the bottom to support the terminal member 81, while the substrate 70 and the first housing 61 can be properly electrically connected by using the conductor 90.

In addition, according to the embodiment, the conductor 90 has the first member 91 and the second member 92, the first member 91 has the first connector 91*c*, and the second member 92 has the second connector 92*c* and contacts the first member 91 in the axial direction. Therefore, it is possible to carry out an assembling process of assembling the second member 92 after the first member 91 is assembled. Accordingly, during a period from the time when the first member 91 is assembled to the time when the second member 92 is assembled, compared with the case where the conductor 90 is a single component, the significant protrusion of the conductor 90 from the inside of the first housing 61 toward the upper side in the axial direction can be suppressed. Therefore, the assembling process after the first member 91 is assembled can be carried out easily. Thus, the assembling property of the rotary electric machine 10 and the pump 100 can be facilitated.

In addition, according to the embodiment, the second member 92 penetrates through the support 64 in the axial direction to be held by the support member 64. Therefore, by assembling the support 64 in the state in which the second member 92 is held, the second member 92 can be assembled. Accordingly, the second member 92 can be assembled to be brought into contact with the first member 91 in a state in which the second connector 92*c* of the second member 92 is not connected with the substrate 70. Therefore, before the process of connecting the second member 92 and the substrate 70, a conduction confirmation process of confirming whether the first member 91 and the second member 92 are electrically connected can be carried out.

As shown in FIG. 5, the second connector 92*c* has a press-fitter 92 swelling in the circumferential direction. The press-fitter 92*f* is provided at the axial central part of the second connector 92*c*. A hole 92*g* penetrating through the press-fitter 92*f* in the radial direction is provided in the press-fitter 92*f*. The press-fitter 92*f* is elastically deformable in an orientation in which the hole 92*g* is crushed. In the embodiment, the second connector 92*c* is fixed to the substrate 70 by press-fitting the press-fitter 92*f* into the grounding hole 71. The second connector 92*c* is a press-fit terminal. The press-fitter 92*f* contacts the plated part 71*a*. As shown in FIG. 4, the upper end of the second connector 92*c* is inserted into a concave 62*i* recessed from the lower end of the connector 62*e* toward the upper side.

An operator, etc., assembling the pump 100 inserts the third insulator 50 into the first housing 61 from the opening on the upper side after the stator 40 is provided in the first housing 61. With a snap-fit structure in which the claws 53 of the third insulator 50 are hooked to the claws 44*e* of the insulator 42, the operator, etc., fixes the third insulator 50 to the stator 40. The operator, etc., holds the coil lead wire 43*a* drawn out from the coil 43 in the concave 52*a* of the lead wire holder 52 of the third insulator 50 in a state of being fixed to the stator 40. The operator, etc., pinches the protrusion 91*d* by using a jig to insert the first member 91 into the first housing 61 from the opening on the upper side. The operator, etc., inserts the first connector 91*c* between the radially outer surface of the third insulator 50 and the radially inner surface of the first housing 61 while installing the first member 91 to the third insulator 50. At the time of inserting the first connector 91*c*, the first connector 91*c* is in contact with the radially outer surface of the third insulator 50 and the radially inner surface of the first housing 61, and is pressed by the radially outer surface of the third insulator 50 and the radially inner surface of the first housing 61 to be elastically deformed in the radial direction.

Then, the operator inserts the terminal member assembly 80 into the first housing 61 from the opening on the upper side, and fits the terminal member assembly 80 into the upper end of the first housing 61. Accordingly, the coil connector 81*b* of the terminal member 81 held by the support 64 is electrically connected with the coil lead wire 43*a*, and the second member 92 held by the support 64 is electrically connected with the first member 91. By conducting a current test between the second member 92 and the first housing 61 in such state, before the substrate 70 is provided, whether the first member 91 and the second member 92 are electrically connected can be determined before the substrate 70 is provided.

Then, the operator, etc., provides the rotor 30 by inserting the rotor 30 into the first housing 61. The rotor 30 may also be provided before the terminal member assembly 80 is provided in the first housing 61. Then, the operator, etc., provides the substrate 70 on the upper side of the terminal member assembly 80. At this time, the operator, etc., brings the substrate 70 toward the substrate supports 64*f* in a state in which the respective protrusions 64*g* are inserted into the respective holes 70*a* to position the substrate 70 in the radial direction. Accordingly, by moving the substrate 70 until contacting the substrate supports 64*f*, the substrate connectors 81*c* can be properly pressed into the holes 70*b* of the substrate 70, and the second connector 92*c* can be properly pressed into the grounding hole 71 of the substrate 70. In this way, in the embodiment, by simply bringing the substrate 70 toward the terminal member assembly 80 from the upper side, the terminal member 81 and the conductor 90 can be easily connected with the substrate 70. Then, the operator, etc., hooks the fixing claws 62d to the fixing groove 61j of the first housing 61 to fix the cover member 62a to the first housing 61. According to the above, the rotary electric machine 10 is assembled.

In the following, several embodiments different from the above are described. In the following description of each embodiment, the description may be omitted by appropriately assigning the same reference numerals to the same components as those described above. Also, regarding the parts corresponding to the respective parts of the configuration described above, the same terms and different reference numerals are used to explain the differences from the above configuration, and the description about the similarities with the above configuration may be omitted. As a configuration whose description is omitted in each of the following embodiments, the same configuration as the configuration described above can be adopted as long as no conflicts are caused.

Figure 9:
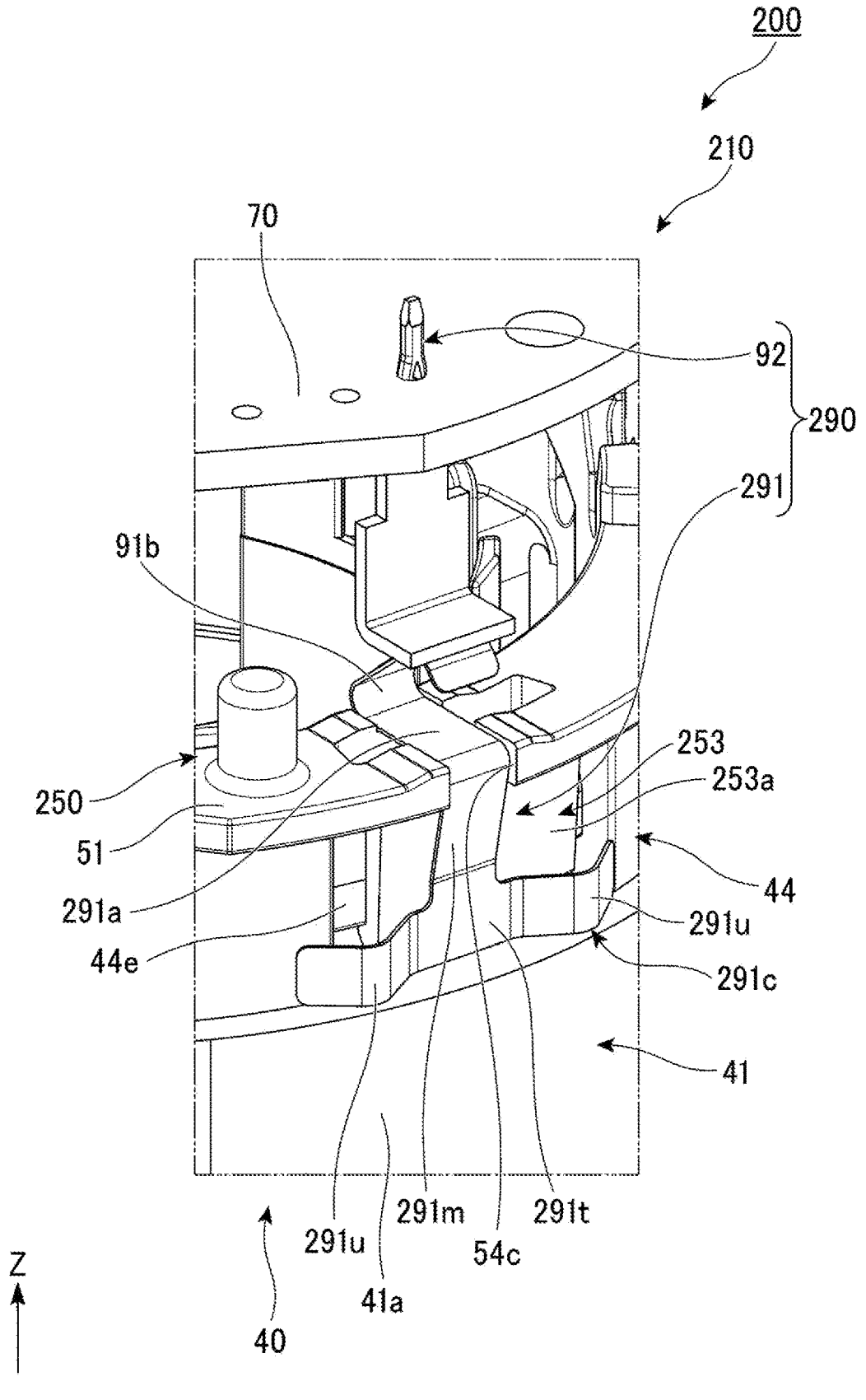
FIG. 9 is a perspective view illustrating a portion of a pump according to a second embodiment.

As shown in FIG. 9, in a rotary electric machine 210 of a pump 200 of the embodiment, a conductor 290 has a first member 291, and a second member 292. The first member 291 has a supported part 291a, the elastic part 91b, and a first connector 291c. The supported part 291a extends in the radial direction, and is in an oblong shape or a substantially oblong shape in which the plate surface is oriented toward the axial direction. The supported part 291a is supported from the lower side by the ring-shaped part 51.

The first connector 291c has an extension 291m, a link 291t, and a pair of contact projections 291u. The extension 291m is in an oblong shape or a substantially oblong shape obliquely extending from the radially outer end of the supported part 291a toward the lower side and the radially inner side. The extension 291m is located separately from the radially outer side of a claw 253 of a third insulator 250. Except for the point that the support concave 54d is provided on the radially outer surface in a base 253a of the claw 253, the third insulator 250 is the same as the third insulator 50 of the first embodiment.

The link 291t is connected with the lower end of the extension 291m. The link 291t is in a plate shape or a substantially plate shape in which the plate surface is oriented toward the radial direction. The link 291t protrudes toward both sides in the circumferential direction with respect to the lower end of the extension 291m. The link 291t is in contact with the radially outer surface of the base 253a of the claw 253. Accordingly, the first member 291 contacts the radially outer surface of the third insulator 250.

The pair of contact projections 291u are respectively connected with both sides of the link 291t in the circumferential direction. The pair of contact projections 291u extend in the circumferential direction from the link 291t. When viewed in the circumferential direction, the pair of contact projections 291u are in a plate shape or a substantially plate shape extending in a V shape or a substantially V shape convex toward the radially outer side. In the pair of contact projections 291u having a V shape or a substantially V shape when viewed in the axial direction, the top on the radially outer side contacts the inner circumferential surface of the first housing 61. Accordingly, the first connector 291c is electrically connected with the first housing 61 inside the first housing 61. Therefore, by using the conductor 290, the grounding pattern 72 of the substrate 70 is electrically connected with the first housing 61 formed of metal.

Figure 10:
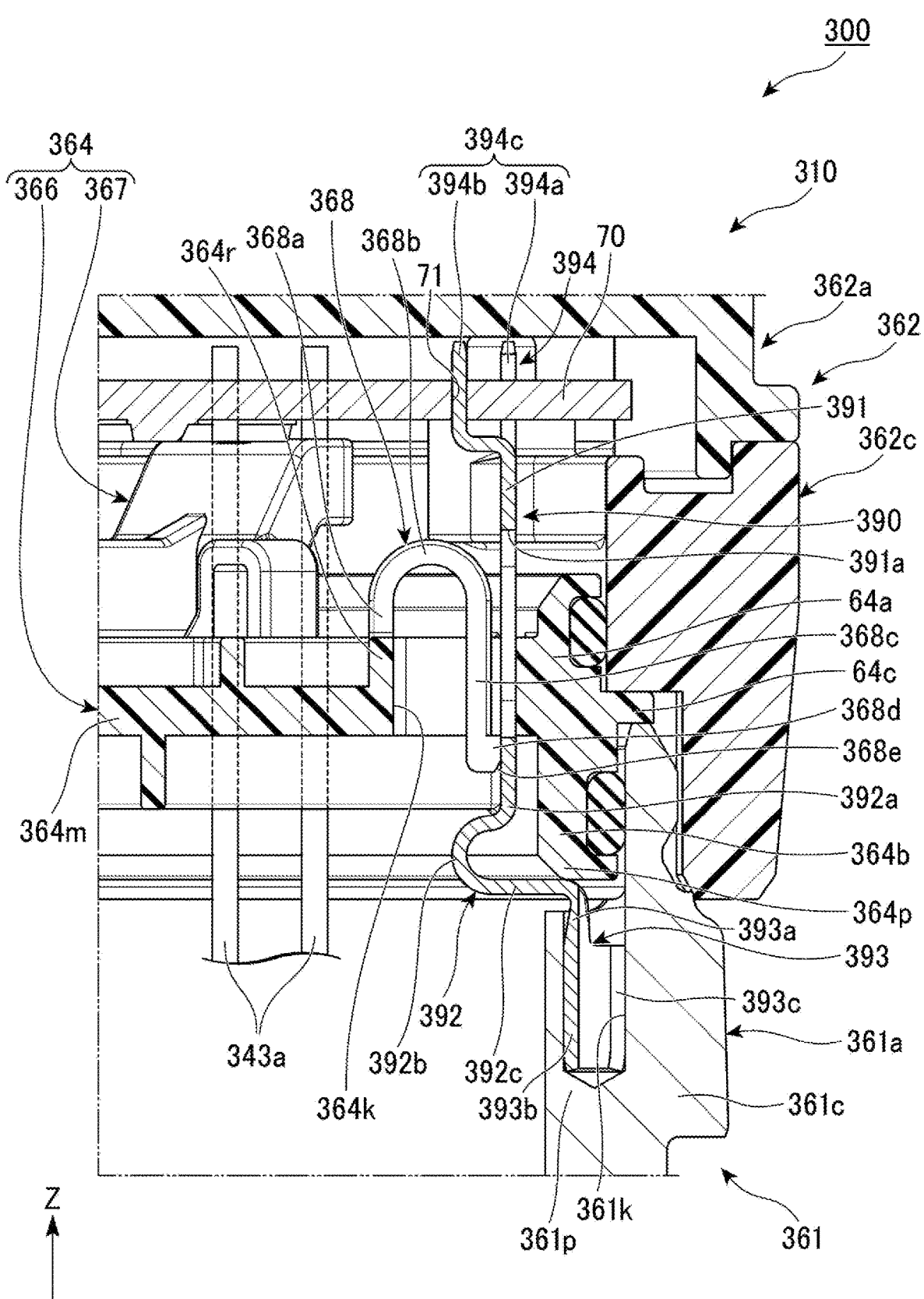
FIG. 10 is a cross-sectional view illustrating a portion of a pump according to a third embodiment.
Figure 11:
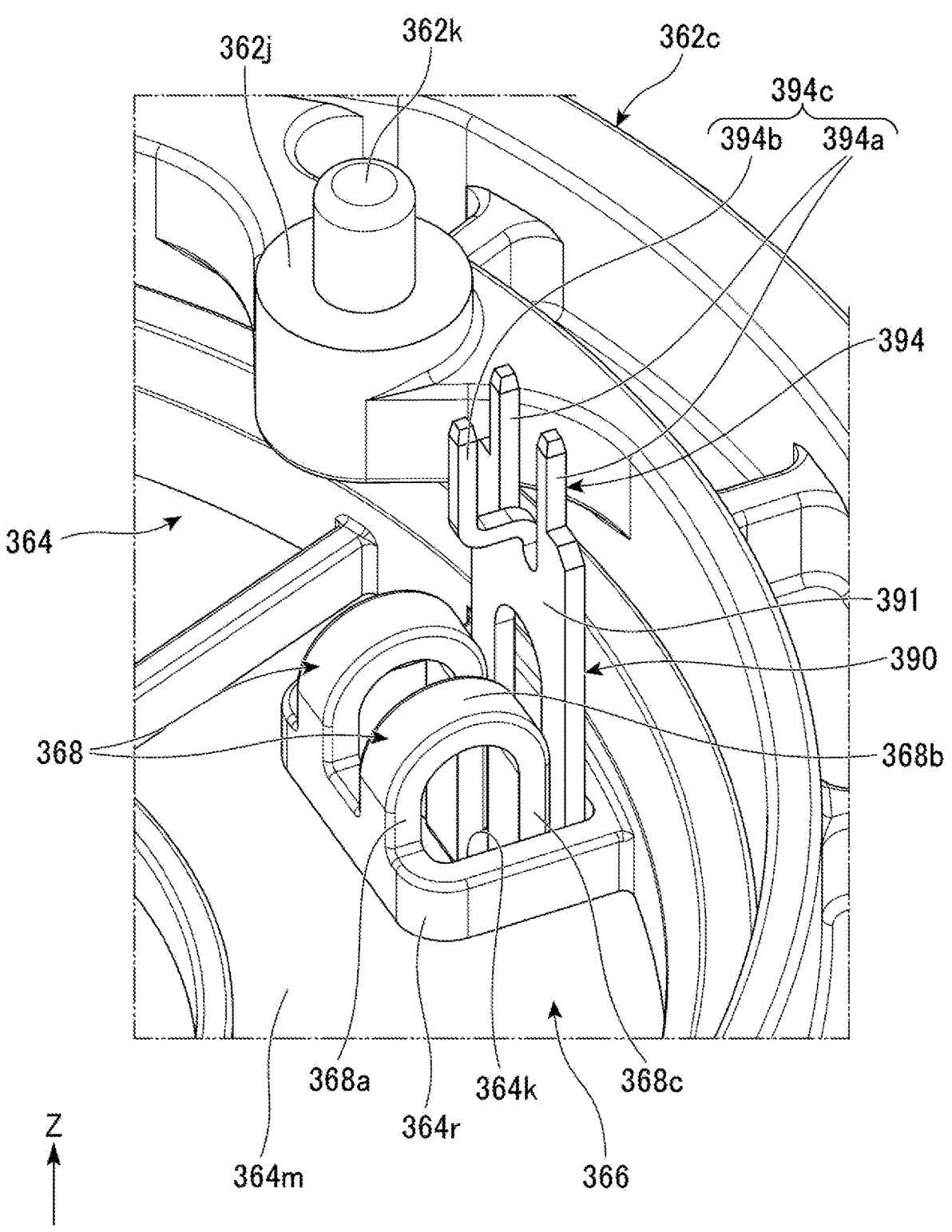
FIG. 11 is a perspective view illustrating a portion of the pump according to the third embodiment.

As shown in FIGS. 10 and 11, in a rotary electric machine 310 of a pump 300 of the embodiment, a second housing 362 has a bottom 364, a cover part 362a, and a tube 362c. The bottom 364, the cover part 362a, and the tube 362c are components separate from each other. The tube 362c is in a tubular shape or a substantially tubular shape open on both ends in the axial direction. The cover part 362a is fixed to the upper side of the tube 362c and blocks the opening on the upper side of the tube 362c. The cover part 362a and the tube 362c form a cover substantially same as the cover 62a of the first embodiment. As shown in FIG. 11, the tube 362c has a substrate support 362j and a protrusion 362k. The substrate support 362j supports the substrate 70 from the lower side, and the protrusion 362k protrudes from the substrate support 362j toward the upper side. The protrusion 362k passes through a hole provided in the substrate 70 in the axial direction.

As shown in FIG. 10, the bottom 364 has a bottom body 366 and a coil lead wire support 367. The bottom body 366 and the lead wire support 367 are components separate from each other. The coil lead wire support 367 is fixed to the upper side of the bottom body 366. The coil lead wire support 367 has a hole through which the coil lead wire 343a passes in the axial direction, and supports the coil lead wire 363a passing through the hole. Accordingly, the bottom 364 supports the coil lead wire 343a drawn out from the coil 43. The coil lead wire 343a supported by the coil lead wire support 367 protrudes toward the upper side with respect to the coil lead wire support 367, and is electrically connected with the substrate 70. In the embodiment, the coil lead wire support 367 supports two coil lead wires 343a. While not shown in the drawings, multiple coil lead wire supports 367 are provided at intervals in the circumferential direction.

Except for the point of having a bottom wall 364m, the bottom body 366 substantially has the same structure as the support 64 of the first embodiment. The bottom wall 364m expands in the radial direction. The radially outer edge of the bottom wall 364m is connected with the radially inner edge of the first ring-shaped part 64a. In the bottom wall 364m, a first through hole 364k penetrating through the bottom wall 364m in the axial direction is provided. That is, the bottom 364 has the first through hole 364k penetrating through the bottom 364 in the axial direction. As shown in FIG. 11, in the embodiment, the first through hole 364k is provided at the radially outer edge of the bottom wall 364m. When viewed in the axial direction, the first through hole 364k is in an oblong shape or a substantially oblong shape with rounded corners. The periphery of the first through hole 364k forms a frame-shaped part 364r protruding toward the upper side. The frame-shaped part 364r is in an oblong frame shape or a substantially oblong frame shape.

An elastic holder 368 is provided in the frame-shaped part 364r. That is, the bottom 364 has the elastic holder 368. In the embodiment, the elastic holder 368 is provided at a portion located on the radially inner side in the frame-shaped part 364r. As shown in FIG. 10, the elastic holder 368 has a first extension 368a, an arc 368b, a second extension 368c, and a pressing claw 368d. The first extension 368a protrudes toward the upper side from the frame-shaped part 364r. The arc 368b is connected with the upper end of the first extension 368a. When viewed in the circumferential direction, the arc 368b extends in a semi-arc shape or a substantially semi-arc shape convex upward from the upper end of the first extension 368a toward the radially outer side.

The second extension 368c extends toward the lower side from the radially outer end of the arc 368b. The second extension 368c passes through the first through hole 364k in the axial direction. Accordingly, in the embodiment, a portion of the elastic holder 368 is located inside the first through hole 364k. It may also be that the entirety of the elastic holder 368 is located inside the first through hole 364k The lower end of the second extension 368c protrudes toward the lower side from the first through hole 364k. The pressing claw 368d protrudes from the lower end of the second extension 368c toward the radially outer side. The lower portion on the radially outer surface of the pressing claw 368d serves as an inclined surface 368e located on the radially outer side toward the upper side.

The elastic holder 368 is elastically deformable. In the embodiment, the elastic holder 368 is elastically deformable in the radial direction. More specifically, the second extension 368c is elastically deformable toward the radially inner side, with the arc 368b as a fulcrum. As shown in FIG. 11, a pair of elastic holders 368 are provided at intervals in the circumferential direction.

Figure 12:
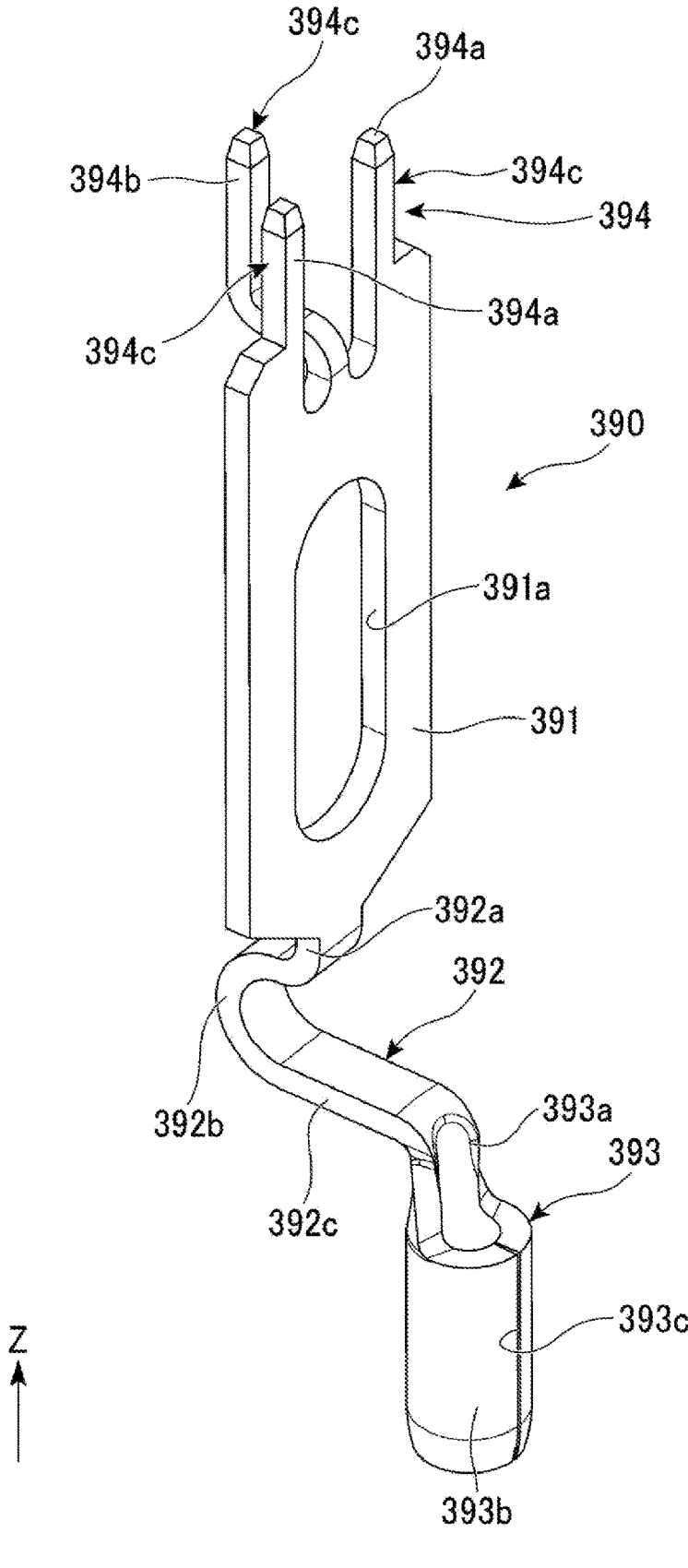
FIG. 12 is a perspective view illustrating a conductor according to the third embodiment.

As shown in FIG. 12, in the embodiment, the conductor 390 is a single component. Therefore, compared with the case where the conductor 390 is defined by multiple components, the number of parts of the rotary electric machine 310 is reduced. The conductor 390 has a body 391, a link 392, a first connector 393, and a second connector 394. The body 391 extends in the axial direction. The body 391 is in a plate shape or a substantially plate shape in which the plate surface is oriented toward the radial direction. The body 391 has a through hole 391a penetrating through the body 391 in the radial direction. The through hole 391a extends in the axial direction.

As shown in FIGS. 10 and 11, the body 391 passes through the first through hole 364k in the axial direction. Accordingly, the conductor 390 passes through the first through hole 364k. The radially outer surface of the body 391 contacts a surface located on the radially outer side in the inner surface of the first through hole 364k The pressing claw 368d of the elastic holder 368 contacts the radially inner surface of the body 391. Accordingly, the conductor 390 contacts the elastic holder 368 and the inner surface of the first through hole 364k. Therefore, the conductor 390 can be stably held in the first through hole 364k by using the elastic holder 368. In addition, even if there is a need for finely adjusting the radial position of the conductor 390, by elastically deforming the elastic holder 368, the radial position of the conductor 390 can be adjusted easily. Therefore, the conductor 390 can be easily connected with the substrate 70. In the embodiment, the elastic holder 368 contacts the conductor 390 in the state of being elastically deformed. Accordingly, by using the elastic holder 368, the conductor 390 is pressed against the inner surface of the first through hole 364k. Therefore, the conductor 390 can be stably held in the first through hole 364k.

As shown in FIG. 12, the link 392 is a plate-shaped portion extending from the lower end of the body 391. The link 392 has a root 392a, a curved part 392b, and a radial extension 392c. The root 392a protrudes from the lower end of the body 391 toward the lower side. When viewed in the circumferential direction, the curved part 392b extends in a semi-arc shape a substantially semi-arc shape convex radially inward from the lower end of the root 392a toward the lower side. That is, the conductor 390 in the embodiment has the curved part 392b curved in an orientation of being convex toward a direction intersecting with the axial direction. Accordingly, the conductor 390 can be easily deformed elastically in the axial direction. Therefore, the force applied from the first housing 361 to the conductor 390 can hardly be transmitted to the connected portion between the conductor 390 and the substrate 70. Also, since the position of the conductor 390 can be finely adjusted by elastically deforming the conductor 390, the conductor 390 can be easily assembled. The radial extension 392c extends from the lower end of the curved part 392b toward the radially outer side. The radial extension 392c is in an oblong shape or a substantially oblong shape in which the plate surface is oriented toward the axial direction.

The first connector 393 extends from the radially outer end of the radial extension 392c toward the lower side. The first connector 393 has an extension 393a and a connector body 393b. The extension 393a is connected with the radial extension 392c, and the connector body 393b is connected with the lower end of the extension 393a. The connector body 393b is in a cylindrical shape or a substantially cylindrical shape open on both ends in the axial direction. The lower end of the extension 393a is connected with the radially inner portion of the connector body 393b. A slit 393c extending in the axial direction is provided on the radially outer portion of the connector body 393b. In the circumferential direction with the central axis of the cylindrically or substantially cylindrically shaped connector body 393b as the center, the slit 393c separates the connector body 393b. By providing the slit 393c, the connector body 393b is in a C shape or a substantially C shape open on the radially outer side when viewed in the axial direction.

As shown in FIG. 10, the first housing 361 has a hole 361k open in the inside of the first housing 361. The hole 361k is provided at a connected part 361p provided on the radially inner surface of a stator accommodator 361c in a first housing body 361a. The connected part 361p protrudes toward the radially inner side. The hole 361k is recessed from a surface on the upper side of the connected part 361p toward the lower side. The hole 361k is open on the upper side and has a bottom on the lower side. The opening on the upper side of the hole 361k is provided to be opposite to the lower side of a second ring-shaped part 364b at an interval.

The first connector 393 is pressed into the hole 361k. Therefore, by simply inserting the first connector 393 into the hole 361k through pressing, the first connector 393 can be fixed to the first housing 361, and the first connector 393 is electrically connected with the first housing 361 easily. In the embodiment, the connector body 393b of the first connector 393 is pressed into the hole 361k. Since the connector body 393b is in a cylindrical shape or a substantially cylindrical shape in which a portion is separated by the split 393c, when the connector body 393b is pressed into the hole 361k, the connector body 393b is easily elastically deformed in an orientation in which the slit 393c becomes narrow. Accordingly, the first connector 393 can be easily pressed into the hole 361k.

In the embodiment, the second housing 362 has a contactor 364p contacting a portion of the conductor 390 from the upper side. Therefore, the conductor 390 can be pressed by the second housing 362 from the upper side, and the first connector 393 can be suppressed from being detached from the hole 361k toward the upper side. In addition, at the time when the second housing 362 is installed to the first housing 361 from the upper side, the conductor 390 is pressed from the upper side by the second housing 362, and the first connector 393 can also be pressed into the hole 361k.

In the embodiment, the contactor 364p is the lower end of the second ring-shaped part 364b in the bottom body 366. The contactor 364p contacts the end on the upper side of the first connector 393 in the conductor 390, that is, the upper end of the extension 393a. That is, the contactor 364p contacts the upper end of the first connector 393. Accordingly, the first connector 393 can be properly pressed into the hole 361k by the second housing 362. In addition, in the case where the first connector 393 is pressed into the hole 361 by the second housing 362, an axial force is properly applied to the first connector 393 at ease, and the first connector 393 can be properly pressed into the hole 361k easily.

The second connector 394 has multiple connection terminals 394c penetrating through the substrate 70. Therefore, the area in which the grounding pattern 72 of the substrate 70 and the second connector 394 are connected can be increased. Accordingly, the conductor 390 can be properly electrically connected with the grounding pattern 72. The connection terminals 394c in the embodiment respectively pass through, in the axial direction, the grounding holes 71 provided in the substrate 70. Each of the connection terminals 394c, for example, is electrically connected with the plated part 71a in the grounding hole 71.

As shown in FIG. 11, the connection terminals 394c include a pair of connection terminals 394a with circumferential positions different from each other and a connection terminal 394b with a radial position different from the pair of connection terminals 394a. Therefore, the second connector 394 can be stably connected with the substrate 70. The connection terminal 394b is located on the radially inner side with respect to the pair of connection terminals 394a. The circumferential position of the connection terminal 394b is a circumferential position between the pair of connection terminals 394a. The connection terminal 394b is located on the upper side between the pair of elastic holders 368 in the circumferential direction. When the conductor 390 is inserted into the first through hole 364k from the lower side, the connection terminal 394b passes through between the pair of elastic holders 368 in the axial direction.

Figure 13:
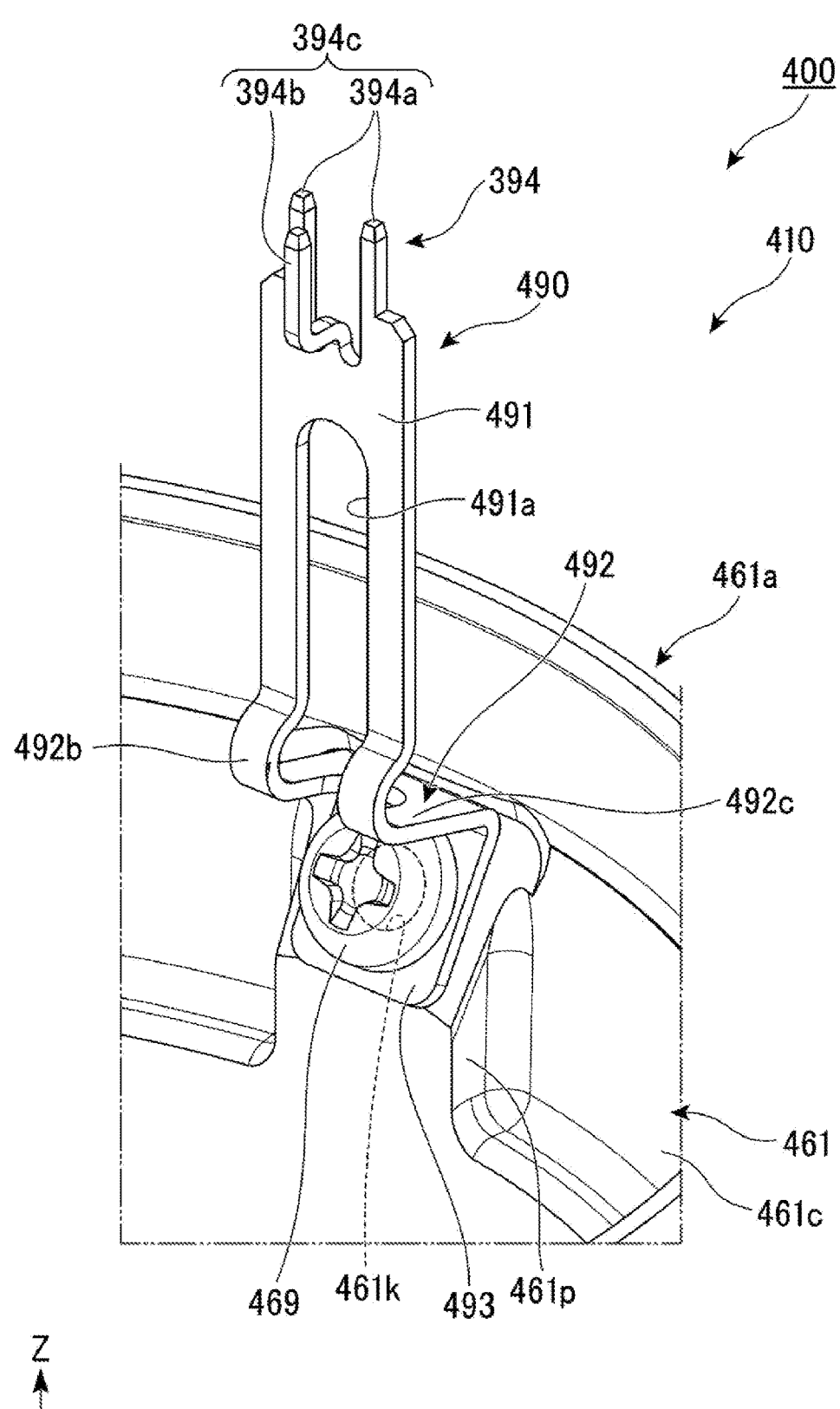
FIG. 13 is a perspective view illustrating a portion of a pump according to a fourth embodiment.
Figure 14:
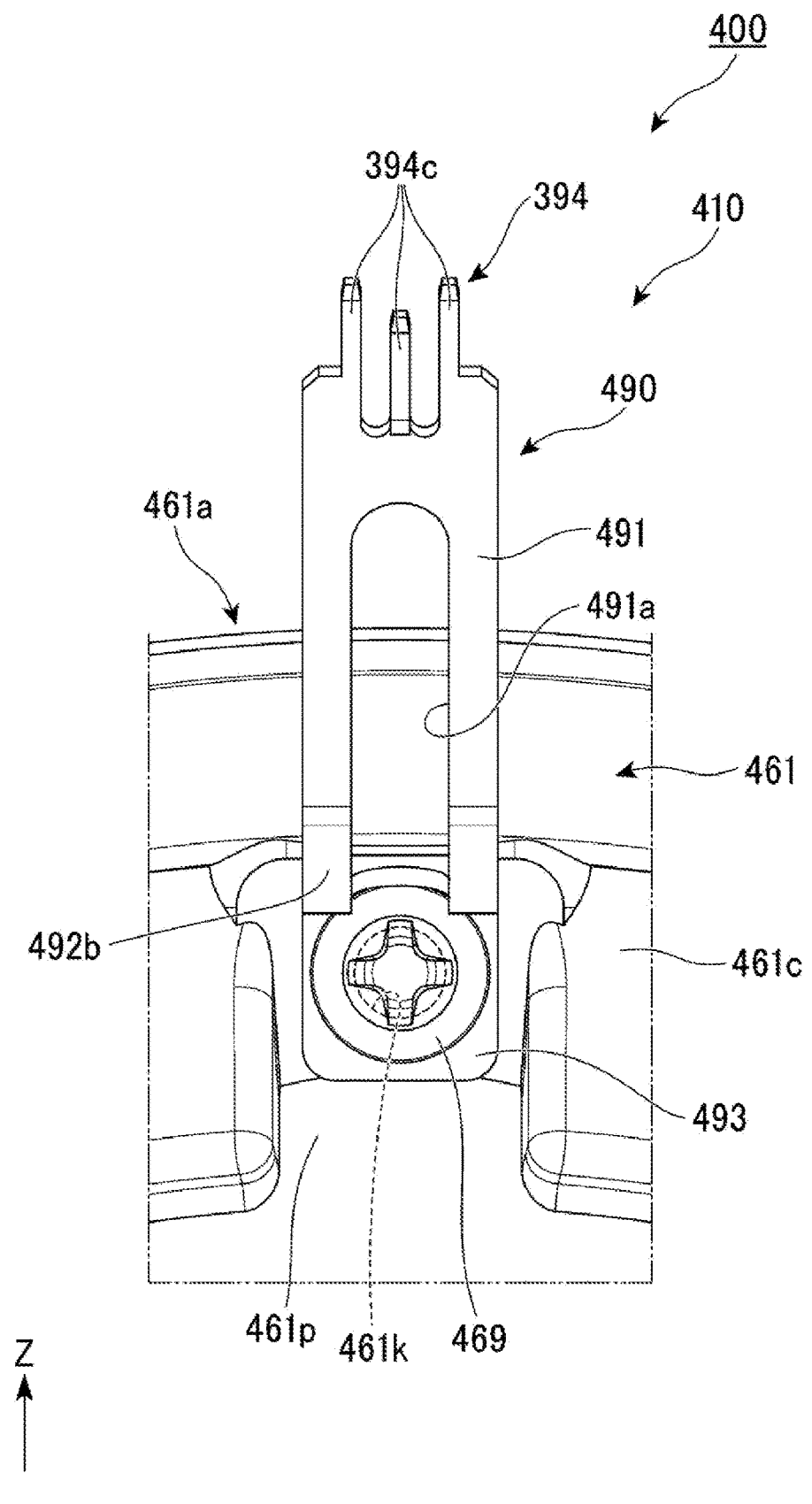
FIG. 14 is a view illustrating a portion of the pump according to the fourth embodiment when viewed in a direction in which a bolt fixing a conductor is tightened into a female threaded hole.

As shown in FIGS. 13 and 14, in a rotary electric machine 410 of a pump 400 of the embodiment, a conductor 490 is a single component, like the third embodiment. The conductor 490 has a body 491, a link 492, a first connector 493, and the second connector 394. The body 491 is in a plate shape or a substantially plate shape which extends in the axial direction and in which the plate surface is oriented toward the radial direction. The link 492 has a curved part 492b and a radial extension 492c. The curved part 492b is curved in an orientation of being convex from the lower end of the body 491 toward the radially inner side.

The first connector 493 is in a rectangular shape or a substantially rectangular shape extending obliquely from the radially outer end of the radial extension 492c toward the radially inner side and the lower side. The first connector 493 is fixed to the inner surface of the first housing 491 by a bolt 469. Therefore, with the axial force of the bolt 469, the first connector 493 can be firmly fixed to a first housing 461, and the first connector 493 can be properly electrically connected with the first housing 461. Accordingly, the first connector 493 and the first housing 461 can become conductive properly.

The bolt 469 passes through a hole provided in the first connector 493 to be tightened to a female threaded hole 461k provided in the first housing 461. That is, the first housing 461 has the female threaded hole 461k into which the bolt 469 is tightened. The female threaded hole 461k is provided in a connected part 461p provided in the first housing 461. The connected part 461p is provided on the radially inner surface of a stator accommodator 461c in a first housing body 461a, and protrudes toward the radially inner side. The upper surface of the connected part 461p faces the upper side and the radially inner side. The female threaded hole 461k is open on the upper surface of the connected part 461p, and is open in an orientation toward the upper side and the radially inner side. Accordingly, the female threaded hole 461k is open inside the first housing 461.

The conductor 490 has a second through hole 491a penetrating through the conductor 490. The second through hole 491a in the embodiment is provided across the body 491, the curved part 492b, and the radial extension 492c. The second through hole 491a is provided at the circumferential central part of each part. By providing the second through hole 491a, the curved part 492b is separated into two in the circumferential direction.

As shown in FIG. 14, a portion of the second through hole 491a is overlapped with the bolt 469 when viewed in a direction in which the bolt 469 is tightened into the female threaded hole 461k. Therefore, a tool, such as a driver, for tightening the bolt 469 can escape through the second through hole 491a, and the tool can be suppressed from contacting the conductor 490. Accordingly, the process of fixing the first connector 493 to the first housing 461 can be carried out easily. In the embodiment, the radial inner end of the portion where the curved part 492b is provided in the second through hole 491a, when viewed in the direction in which the bolt 469 is tightened into the female threaded hole 461k, is overlapped with a portion of the head of the bolt 469.

Figure 15:
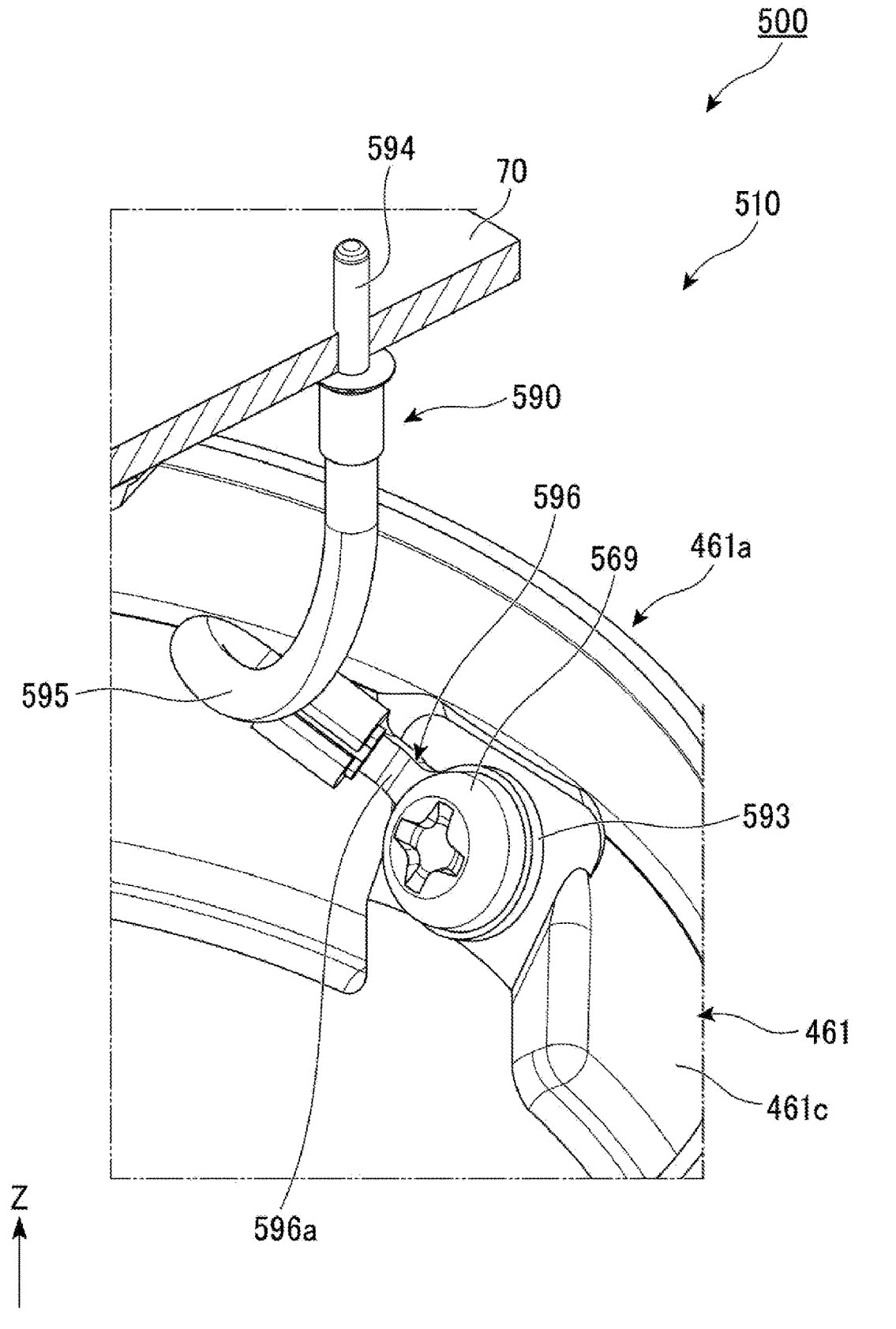
FIG. 15 is a partial cross-sectional perspective view illustrating a portion of a pump according to a fifth embodiment.

As shown in FIG. 15, in a rotary electric machine 510 of a pump 500 of the embodiment, a conductor 590 has a fixer 596, a second connector 594, and a cable 595. In the embodiment, the fixer 596 is a crimp terminal. The fixer 596 has a crimp part 596a and a first connector 593. Like the first connector 493 of the fourth embodiment, the first connector 593 is fixed, by a bolt 569, to the inner surface of the first housing 461. Accordingly, the fixer 596 is fixed to the first housing 461. The cable 595 connects the fixer 596 and the second connector 594. In this way, by defining a portion connecting the fixer 596 having the first connector 593 and the second connector 594 as the cable 596, the degree of freedom of routing from the first connector 593 to the second connector 594 can be facilitated. Therefore, the conductor 590 can be provided easily.

In the embodiment, the crimp part 596a is fixed to an end of the cable 595. The second connector 594 is fixed to the other end of the cable 595. The second connector 594 penetrates through the substrate 70 in the axial direction and is connected with the substrate 70. While not shown in the drawings, the second connector 594, for example, is electrically connected with the substrate 70 by soldering, etc., for example, and is electrically connected with the grounding pattern 72 of the substrate 70.

The disclosure is not limited to the above-described embodiments, and other configurations and other methods may be adopted within the scope of the technical idea of the disclosure. The conductor may be defined in any shape as long as the conductor has the first connector electrically connected with the first housing inside the first housing and the second connector electrically connected with the grounding pattern of the substrate. The conductor may also be defined by three or more components. The process of connecting the first connector and the first housing and the process of connecting the second connector and the grounding pattern are not particularly limited. In the case where the conductor has the first member and the second member, it may also be that the second member has the elastic part elastically deformable in the axial direction, or both of the first and second members have the elastic parts.

The support supporting the substrate from the other side (lower side) in the axial direction may have a shape having the bottom wall partitioning the inside of the first housing and the inside of the second housing like the bottom 364 of the third embodiment, and may also have a ring shape or a substantially ring shape like the support 64 of the first embodiment. The insulator supporting the first member of the conductor from the other side in the axial direction and contacting the first member on the radially outer side may also be a component defining the insulator of the stator. That is, in the first embodiment, in place of the third insulator 50, it may also be that the first member 91 is supported from the lower side by the first insulator 44, or the first member 91 contacts the radially outer side of the first insulator 44. The substrate may also be a substrate of any structure, as long as the substrate is provided with a grounding pattern.

The rotary electric machine suitable for the disclosure is not limited to a motor, and may also be a power generator. The purpose of the rotary electric machine is not particularly limited. The rotary electric machine may also be mounted to an apparatus other than a pump. The purpose of the pump is not particularly limited, and the pump may also be mounted to an apparatus other than the vehicle.

The technique may have configurations as follows. (1) A rotary electric machine has: a rotor, able to rotate about a central axis as a center; a stator, opposite to the rotor, with a gap being interposed between the rotor and the stator; a substrate, electrically connected with the stator; a first housing, formed of metal, being open on a side in an axial direction, and accommodating the stator; a second housing, fixed, on the side in the axial direction, to the first housing, accommodating the substrate, and having an insulating property; and a conductor, electrically connected with the substrate and the first housing. The substrate has a grounding pattern. The conductor has: a first connector, electrically connected with the first housing inside the first housing; and a second connector, electrically connected with the grounding pattern. (2) In the rotary electric machine of (1), the first housing has: a first housing body, accommodating the stator; and an installer, protruding from the first housing body toward a radially outer side. (3) In the rotary electric machine of (1) or (2), the second housing has a bottom located between the substrate and the stator in the axial direction, the bottom supports a coil lead wire drawn out from a coil of the stator or a terminal member electrically connected with the coil lead wire, and the conductor penetrates through the bottom in the axial direction. (4) In the rotary electric machine of (3), the bottom has: a first through hole, which penetrates through the bottom in the axial direction, and through which the conductor passes; and an elastic holder, having at least a portion located inside the first through hole, and being elastically deformable. The conductor contacts the elastic holder and an inner surface of the first through hole. (5) In the rotary electric machine of any one of (1) to (4), the conductor has: a first member, having the first connector; a second member, having the second connector and contacting the first member in the axial direction. (6) In the rotary electric machine of (5), at least one of the first member and the second member has an elastic part elastically deformable in the axial direction, and the first member and the second member contact each other via the elastic part. (7) In the rotary electric machine of (6), the second housing has: support, supporting the substrate from an other side in the axial direction; a cover, covering the substrate from the side in the axial direction. The second member penetrates through the support in the axial direction, and is held by the support. (8) In the rotary electric machine of (6) or (7), the rotary electric machine includes an insulator, located, on the side of the axial direction, at a stator core in the stator. The insulator is located inside the first housing, a gap is provided between the insulator and the first housing in a radial direction, the first member is supported by the insulator from an other side in the axial direction and contacts a radially outer surface of the insulator, and the first connector is elastically deformable in the radial direction, located between the radially outer surface of the insulator and a radially inner surface of the first housing in the radial direction, and contacts the radially inner surface of the first housing. (9) In the rotary electric machine of (8), the first member has: a supported part, contacting the insulator in the axial direction and the radial direction; the elastic part, protruding from a radially inner end of the supported part toward the side in the axial direction; and a protrusion, protruding from a radially outer end of the supported part toward the side in the axial direction. (10) In the rotary electric machine of (9), a groove open on a radially outer side and extending in the radial direction is provided on a surface of the insulator on the side in the axial direction, and at least a portion of the supported part is fit into the groove. (11) In the rotary electric machine of any one of (1) to (4), the conductor is a single component. (12) In the rotary electric machine of any one of (1) to (4), the conductor has: a fixer, having the first connector and being fixed to the first housing; and a cable, connecting the fixer and the second connector. (13) In the rotary electric machine of any one of (1) to (7), the first housing has a hole open in an inside of the first housing, and the first connector is pressed into the hole. (14) In the rotary electric machine of (13), the hole is open on the side in the axial direction, and the second housing has a contactor contacting a portion of the conductor from the side in the axial direction. (15) In the rotary electric machine of any one of (1) to (7), the first connector is fixed to an inner surface of the first housing by a bolt. (16) In the rotary electric machine of (15), the first housing has a female threaded hole which is open in an inside of the first housing and into which the bolt is tightened, the conductor has a second through hole penetrating through the conductor, and when viewed in a direction in which the bolt is tightened into the female threaded hole, a portion of the second through hole is overlapped with the bolt. (17) In the rotary electric machine of any one of (1) to (16), the conductor has a curved part curved in an orientation of being convex toward a direction intersecting with the axial direction. (18) In the rotary electric machine of any one of (1) to (17), the second connector has multiple connection terminals penetrating through the substrate. (19) In the rotary electric machine of (18), the connection terminals include: a pair of connection terminals with circumferential positions different from each other; and a connection terminal with a radial position different from the pair of connection terminals (20). A pump includes: the rotary electric machine of (1) to (19); and a pump mechanism, connected with the rotary electric machine.

The configurations and processes described in this specification can be combined as appropriate within a mutually consistent range.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotary electric machine, comprising:
a rotor, able to rotate about a central axis as a center;
a stator, opposite to the rotor, with a gap being interposed between the rotor and the stator;
a substrate, electrically connected with the stator;
a first housing, formed of metal, being open on a side in an axial direction, and accommodating the stator;
a second housing, fixed, on the side in the axial direction, to the first housing, accommodating the substrate, and having an insulating property; and
a conductor, electrically connected with the substrate and the first housing,
wherein
the substrate has a grounding pattern, and
the conductor has:
a first connector, electrically connected with the first housing inside the first housing; and
a second connector, electrically connected with the grounding pattern.

2. The rotary electric machine as claimed in claim 1, wherein the first housing has:
a first housing body, accommodating the stator; and
an installer, protruding from the first housing body toward a radially outer side.

3. The rotary electric machine as claimed in claim 1, wherein the second housing has a bottom located between the substrate and the stator in the axial direction,
the bottom supports a coil lead wire drawn out from a coil of the stator or a terminal member electrically connected with the coil lead wire, and
the conductor penetrates through the bottom in the axial direction.

4. The rotary electric machine as claimed in claim 3, wherein the bottom has:
a first through hole, which penetrates through the bottom in the axial direction, and through which the conductor passes; and
an elastic holder, having at least a portion located inside the first through hole, and being elastically deformable,
wherein the conductor contacts the elastic holder and an inner surface of the first through hole.

5. The rotary electric machine as claimed in claim 1, wherein the conductor has:
a first member, having the first connector;
a second member, having the second connector and contacting the first member in the axial direction.

6. The rotary electric machine as claimed in claim 5, wherein at least one of the first member and the second member has an elastic part elastically deformable in the axial direction, and
the first member and the second member contact each other via the elastic part.

7. The rotary electric machine as claimed in claim 6, wherein the second housing has:
a support, supporting the substrate from an other side in the axial direction;
a cover, covering the substrate from the side in the axial direction,
wherein the second member penetrates through the support in the axial direction, and is held by the support.

8. The rotary electric machine as claimed in claim 6, comprising:
an insulator, located, on the side of the axial direction, at a stator core in the stator,
wherein the insulator is located inside the first housing, a gap is provided between the insulator and the first housing in a radial direction,
the first member is supported by the insulator from an other side in the axial direction and contacts a radially outer surface of the insulator, and
the first connector is elastically deformable in the radial direction, located between the radially outer surface of the insulator and a radially inner surface of the first housing in the radial direction, and contacts the radially inner surface of the first housing.

9. The rotary electric machine as claimed in claim 8, wherein the first member has:
a supported part, contacting the insulator in the axial direction and the radial direction;
the elastic part, protruding from a radially inner end of the supported part toward the side in the axial direction; and
a protrusion, protruding from a radially outer end of the supported part toward the side in the axial direction.

10. The rotary electric machine as claimed in claim 9, wherein a groove open on a radially outer side and extending in the radial direction is provided on a surface of the insulator on the side in the axial direction, and
at least a portion of the supported part is fit into the groove.

11. The rotary electric machine as claimed in claim 1, wherein the conductor is a single component.

12. The rotary electric machine as claimed in claim 1, wherein the conductor has:
a fixer, having the first connector and being fixed to the first housing; and
a cable, connecting the fixer and the second connector.

13. The rotary electric machine as claimed in claim 1, wherein the first housing has a hole open in an inside of the first housing, and
the first connector is pressed into the hole.

14. The rotary electric machine as claimed in claim 13, wherein the hole is open on the side in the axial direction, and
the second housing has a contactor contacting a portion of the conductor from the side in the axial direction.

15. The rotary electric machine as claimed in claim 1, wherein the first connector is fixed to an inner surface of the first housing by a bolt.

16. The rotary electric machine as claimed in claim 15, wherein the first housing has a female threaded hole which is open in an inside of the first housing and into which the bolt is tightened,
the conductor has a second through hole penetrating through the conductor, and
when viewed in a direction in which the bolt is tightened into the female threaded hole, a portion of the second through hole is overlapped with the bolt.

17. The rotary electric machine as claimed in claim 1, wherein the conductor has a curved part curved in an orientation of being convex toward a direction intersecting with the axial direction.

18. The rotary electric machine as claimed in claim 1, wherein the second connector has a plurality of connection terminals penetrating through the substrate.

19. The rotary electric machine as claimed in claim 18, wherein the connection terminals comprise:
a pair of connection terminals with circumferential positions different from each other; and
a connection terminal with a radial position different from the pair of connection terminals.

20. A pump, comprising:

the rotary electric machine as claimed in claim 1; and a pump mechanism, connected with the rotary electric
machine.

\* \* \* \* \*